US012794611B2

(12) United States Patent
Zhou et al.

(10) Patent No.: US 12,794,611 B2
(45) Date of Patent: Nov. 10, 2026

(54) METHOD AND DEVICE FOR DETERMINING RESOURCES FOR SIDELINK TRANSMISSION

(71) Applicant: Samsung Electronics Co., Ltd., Suwon-si (KR)

(72) Inventors: Miao Zhou, Beijing (CN); Feifei Sun, Beijing (CN); Min Wu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 267 days.

(21) Appl. No.: 18/797,080

(22) Filed: Aug. 7, 2024

(65) Prior Publication Data

US 2025/0055615 A1 Feb. 13, 2025

(30) Foreign Application Priority Data

Aug. 9, 2023 (CN) ......................... 202311002206.3

(51) Int. Cl.
*H04L 5/00* (2006.01)
*H04W 92/18* (2009.01)

(52) U.S. Cl.
CPC .......... *H04L 5/0026* (2013.01); *H04L 5/0048* (2013.01); *H04W 92/18* (2013.01)

(58) Field of Classification Search
CPC ..... H04L 5/0026; H04L 5/0048; H04W 92/18
See application file for complete search history.

(56) References Cited

U.S. PATENT DOCUMENTS 9,768,930 B2 * 9/2017 Park ...................... H04L 5/0053
2021/0105123 A1 * 4/2021 Luo ...................... H04L 5/0057
2022/0046613 A1 * 2/2022 Lee .................... H04B 7/06952
(Continued)

FOREIGN PATENT DOCUMENTS

EP 4270852 A2 * 11/2023 ......... H04L 55/0053
WO 2023/023946 A1 3/2023

OTHER PUBLICATIONS

VIVO, Enhanced sidelink operation on FR2 licensed spectrum, R1-2304483, 3GPP TSG RAN WG1 #113, May 15, 2023, Incheon, Korea.

(Continued)

*Primary Examiner* — Mohammad S Anwar
(74) *Attorney, Agent, or Firm* — Jefferson IP Law, LLP

(57) ABSTRACT

The disclosure relates to a fifth generation (5G) or sixth generation (6G) communication system for supporting a higher data transmission rate. A method performed by a first node in a communication system is provided. The method includes obtaining first information, wherein the first information includes information on channel state information reference signal (CSI-RS) resources and transmitting CSI-RS based on the first information, wherein, in case that the information on the CSI-RS resources indicates that multiplexing type between the CSI-RS resources is time division multiplexing, an adjacent symbol before a first symbol of time division multiplexed CSI-RS resources is a duplication of the first symbol of the time division multiplexed CSI-RS resources, and wherein, in case that all CSI-RS resources are used by the first node and the first node uses a same beam for transmission on the CSI-RS resources, the adjacent symbol before the first symbol of the CSI-RS resources is not a duplication of other symbols.

20 Claims, 14 Drawing Sheets

(56) References Cited

U.S. PATENT DOCUMENTS

| | | | |
|---|---|---|---|
| 2023/0164815 | A1 | 5/2023 | Liu et al. |
| 2024/0187181 | A1 | 6/2024 | Zhao et al. |

OTHER PUBLICATIONS

Zte et al., Discussion on enhanced sidelink operation on FR2 licensed spectrum, R1-2305382, 3GPP TSG RAN WG1 #113, May 15, 2023, Incheon, Korea.

International Search Report dated Nov. 4, 2024, issued in International Application No. PCT/KR2024/011720.

* cited by examiner

METHOD AND DEVICE FOR DETERMINING RESOURCES FOR SIDELINK TRANSMISSION

CROSS-REFERENCE TO RELATED APPLICATION(S)

This application is based on and claims priority under 35 U.S.C. § 119(a) of a Chinese patent application number 202311002206.3, filed on Aug. 9, 2023, in the Chinese Intellectual Property Office, the disclosure of which is incorporated by reference herein in its entirety.

BACKGROUND

1. Field

The disclosure relates to the technical field of wireless communication. More particularly, the disclosure relates to a method for Sidelink (SL) communication based positioning and a device thereof in a wireless communication system.

2. Description of Related Art 5G mobile communication technologies define broad frequency bands such that high transmission rates and new services are possible, and may be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

Aspects of the disclosure are to address at least the above-mentioned problems and/or disadvantages and to provide at least the advantages described below. Accordingly, an aspect of the disclosure is to provide a method for Sidelink (SL) communication based positioning and a device thereof in a wireless communication system.

Additional aspects will be set forth in part in the description which follows and, in part, will be apparent from the description, or may be learned by practice of the presented embodiments.

In accordance with an aspect of the disclosure, a method performed by a first node in a communication system is provided. The method includes obtaining first information, wherein the first information includes information on channel state information reference signal (CSI-RS) resources, and transmitting CSI-RS based on the first information, wherein, in case that the information on the CSI-RS resources indicates that multiplexing type between the CSI-RS resources is time division multiplexing, an adjacent symbol before a first symbol of time division multiplexed CSI-RS resources is a duplication of the first symbol of the time division multiplexed CSI-RS resources, and wherein, in case that all CSI-RS resources are used by the first node and the first node uses a same beam for transmission on the CSI-RS resources, the adjacent symbol before the first symbol of the CSI-RS resources is not a duplication of other symbols.

In some examples, the first information further includes information on physical sidelink control channel (PSCCH) resources, and the method further includes transmitting PSCCH based on the first information, wherein, in case that the information on the PSCCH resources indicates that multiplexing type between the PSCCH resources is the time division multiplexing, an adjacent symbol before a first symbol of time division multiplexed PSCCH resources is a duplication of the first symbol of the time division multiplexed PSCCH resources, and wherein, in case that the information on the PSCCH resources indicates that the multiplexing type between the PSCCH resources is time division multiplexing, and all the time division multiplexed PSCCH resources are used by the first node, an adjacent symbol before the first symbol of the time division multiplexed PSCCH resources is not a duplication of other symbols.

In some examples, the first information further includes information on physical sidelink feedback channel (PSFCH) resources, and the method further includes transmitting PSFCH based on the first information, wherein, in case that the information on the PSFCH resources indicates that multiplexing type between PSFCH resources is the time division multiplexing, an adjacent symbol before a first symbol of time division multiplexed PSFCH resources is a duplication of the first symbol of the time division multiplexed PSFCH resources, and wherein, in case that the physical sidelink shared channel (PSSCH) resources to which the PSFCH resources correspond include different PSSCH resources, an adjacent symbol before the first symbol of PSFCH resources is a duplication of the first symbol of PSFCH resources.

In some examples, in case that the first information indicates that the multiplexing type between the CSI-RS resources and PSCCH resources is time division multiplexing, if any one of the CSI-RS resources corresponds to at least one of the PSCCH resources and any one of the PSCCH resources corresponds to at least one of the CSI-RS resources, the adjacent symbol before the first symbol of the CSI-RS resources is not a duplication of other symbols.

In some examples, the first information further includes information on physical sidelink shared channel (PSSCH) resource, and the method further includes transmitting PSSCH based on the first information, wherein, in case that the CSI-RS resources and the PSSCH resources are both used by the first node and the first node uses a same beam for transmission on the CSI-RS resources and the PSSCH resources, the adjacent symbol before the first symbol of the CSI-RS resources is not a duplication of other symbols.

In some examples, the method further includes in case that a first condition is met, the adjacent symbol before the first symbol of the CSI-RS resource is not a duplication of other symbols, wherein the first condition includes at least one of the following CSI-RS transmission power is the same as PSCCH transmission power, the CSI-RS transmission power and/or the PSCCH transmission power do not reach a maximum value of transmission power, a value of relevant parameter for calculating the CSI-RS transmission power and/or the PSCCH transmission power do not exceed a first threshold or does not comply with a predetermined threshold range, the CSI-RS transmission power and/or the PSCCH transmission power are below a second threshold or complies with a predetermined threshold range, a frequency-domain size of the CSI-RS resources is below a third threshold, a ratio of the frequency-domain size of the CSI-RS resources and a frequency-domain size of PSCCH resources is below a fourth threshold.

In some examples, in case that a time-domain size of the CSI-RS resources exceeds a fifth threshold, the adjacent symbol before the first symbol of the CSI-RS resources is not a duplication of the other symbols.

In some examples, in case that the information on the CSI-RS resources indicates that the multiplexing type between the CSI-RS resources is time division multiplexing, an adjacent symbol after a last symbol of the time division multiplexed CSI-RS resources is used for a gap, and/or wherein, in case that the information on the CSI-RS resources indicates that the multiplexing type between the CSI-RS resources is the time division multiplexing, and multiplexing type between PSCCH/PSSCH/PSFCH resources corresponding to the time division multiplexed CSI-RS resources is time division multiplexing, the adjacent symbol after the last symbol of the time division multiplexed CSI-RS resources is used for the gap.

In some examples, the first information further includes information on PSCCH resources, the method further includes transmitting PSCCH based on the first information, wherein, in case that the information on the PSCCH resources indicates that multiplexing type between the PSCCH resources is time division multiplexing, an adjacent symbol after a last symbol of time division multiplexed PSCCH resources is used for a gap.

In some examples, the first information further includes information on physical sidelink feedback channel, PSFCH, resources, and the method further includes transmitting PSFCH based on the first information, wherein, in case that the information on the PSFCH resources indicates that multiplexing type between the PSFCH resources is time division multiplexing, an adjacent symbol after a last symbol of time division multiplexed PSFCH resources is used for a gap.

In some examples, the first information further includes information on physical sidelink shared channel, PSSCH, resources, and the method further includes transmitting PSSCH based on the first information, wherein, in case that the information on the PSSCH resources indicates that multiplexing type between the PSSCH resources is time division multiplexing, an adjacent symbol after a last symbol of time division multiplexed PSSCH resources is used for a gap.

In some examples, the first information further includes at least one of information on resource used as duplication of other symbols, information on resources used for gap, capability of the first node and/or a second node receiving CSI-RS, information on demodulation reference signal (DMRS) resources, information on resource pool type, information on correspondence between PSCCH resources and CSI-RS resources, and information on correspondence between PSFCH resources and CSI-RS resources.

In some examples, the correspondence between the PSCCH resources and the CSI-RS resources includes at least one of a PSCCH resource corresponds to a CSI-RS resource in a same time unit, a PSCCH resource corresponds to multiple CSI-RS resources in the same time unit, a PSCCH resource corresponds to multiple CSI-RS resources in multiple time units.

In some examples, the first information includes at least one of information in resource pool configuration, information in configuration dedicated to the first node, higher layer configured information, base station configured information, pre-configured information, and/or pre-defined information.

In some examples, the method further includes transmitting sidelink control information (SCI) wherein at least one of the following information is indicated in the SCI information on resource used as duplication of other symbols, information on resources used for gap, information on PSCCH resources, and information on CSI-RS resources.

In some examples, the method further includes determining, based on the first information, at least one of symbols used for at least one of duplication, gap, PSCCH, CSI-RS, PSSCH, PSFCH, DMRS, at least one of starting position, ending position, size of time and/or frequency-domain of PSCCH resources on symbols used for PSCCH, at least one of starting position, ending position, size of time and/or frequency-domain of PSFCH resources on symbols used for PSFCH, correspondence between PSCCH resources and CSI-RS resources, and correspondence between PSFCH resources and CSI-RS resources.

In some examples, the method further includes determining a transmission beam for transmitting at least one of PSCCH, PSSCH, CSI-RS, and transmitting the at least one of PSCCH, PSSCH, CSI-RS using the determined transmission beam. When a symbol is a duplication of another symbol, the symbol uses the same transmission beam as the other symbol. For example, the automatic gain control (AGC) symbol before PSCCH, which is a duplication of the first symbol of PSCCH, uses the same transmission beam as PSCCH, the same is applied to CSI-RS, PSFCH, PSSCH.

In some examples, determining the transmission beam for transmitting PSCCH includes at least one of determining a preset/configured beam as a transmission beam for transmitting the PSCCH, if the first node transmits multiple CSI-RSs on multiple CSI-RS resources using a same beam, and/or transmits at least one CSI-RS and PSSCH on at least one CSI-RS resource and PSSCH resource using a same beam, determining that the same beam as the transmission beam for transmitting the PSCCH, wherein the PSCCH is a PSCCH associated with the multiple CSI-RSs and/or the at least one CSI-RS and PSSCH.

In some examples, in case that the first node transmits multiple CSI-RSs on multiple CSI-RS resources using different beams, and/or transmits at least one CSI-RS and PSSCH on at least one CSI-RS resource and PSSCH resource using different beams, and the first node transmits PSCCH using one PSCCH resource, determining a transmission beam for transmitting PSCCH uses at least one of determining a preset/configured beam as the transmission beam for transmitting the PSCCH, determining a beam for sidelink communication selected by both the first node and a second node receiving PSCCH as the transmission beam for transmitting the PSCCH, and in case that the first node is configured with or determines, according to a preset criterion, a correspondence between a position of PSCCH resources and the transmission beam, determining the transmission beam for the PSCCH based on PSCCH resources and the correspondence, wherein the PSCCH is a PSCCH associated with the multiple CSI-RSs and/or the at least one CSI-RS and PSSCH.

In some examples, in case that the first node transmits multiple CSI-RSs on multiple CSI-RS resources using different beams, and/or transmits at least one CSI-RS and PSSCH on at least one CSI-RS resource and PSSCH resource using different beams, and the first node transmits PSCCH using multiple PSCCH resources, transmitting multiple PSCCHs indicating control information of multiple CSI-RSs and/or PSSCH respectively, and transmitting, on the multiple PSCCH resources, each PSCCH using the same transmission beam as its associated CSI-RS and/or PSSCH.

In some examples, in case that the first node transmits CSI-RS and PSSCH using different beams and there is overlap between time-domain resources of the CSI-RS and time-domain resources of the PSSCH, the first node transmits the CSI-RS and the PSSCH using at least one of dropping transmission of CSI-RS on the overlapped time-domain resources, dropping transmission of PSSCH on the overlapped time-domain resources, transmitting CSI-RS using transmission beam used for the PSSCH on the overlapped time-domain resources or transmitting PSSCH using transmission beam used for the CSI-RS on the overlapped time-domain resources.

In some examples, the method further includes indicating, via SCI or higher layer signaling, at least one of indicating the determined transmission beam for transmitting PSCCH in the higher layer signaling, indicating the determined transmission beam for transmitting PSSCH in the SCI, indicating the determined transmission beam for transmitting PSFCH in the SCI, and indicating the determined transmission beam for transmitting CSI-RS in the SCI.

In some examples, when the first information indicates that a time unit includes multiple PSCCH resources, the method further includes determining the PSCCH resources and/or transmitting PSCCH using at least one of indicating, in a PSCCH with an earliest position in a time-domain in the time unit, whether there are other PSCCH resources used by the first node for transmission in the time unit and/or indicating position of the other PSCCH resources in the time unit, selecting one PSCCH resource with the earliest position in the time-domain or a preset one of the multiple PSCCH resources for transmitting PSCCH, and selecting at least one other PSCCH resource for transmitting PSCCH, obtaining a set of resources in a resource pool based on the first information, and selecting PSCCH resources in the set of resources in case that the multiple PSCCHs are transmitted in the time unit, selecting PSCCH resources except the set of resources in the resource pool in case that one PSCCH is transmitted in the time unit.

In accordance with another aspect of the disclosure, a node is provided. The node includes a transceiver and a processor coupled to the transceiver and configured to obtain first information, wherein the first information includes information on channel state information reference signal (CSI-RS) resources, and transmit CSI-RS based on the first information, wherein, in case that the information on the CSI-RS resources indicates that multiplexing type between the CSI-RS resources is time division multiplexing, an adjacent symbol before a first symbol of time division multiplexed CSI-RS resources is a duplication of the first symbol of the time division multiplexed CSI-RS resources, and wherein, in case that all CSI-RS resources are used by the node and the node uses a same beam for transmission on the CSI-RS resources, the adjacent symbol before the first symbol of the CSI-RS resources is not a duplication of other symbols.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
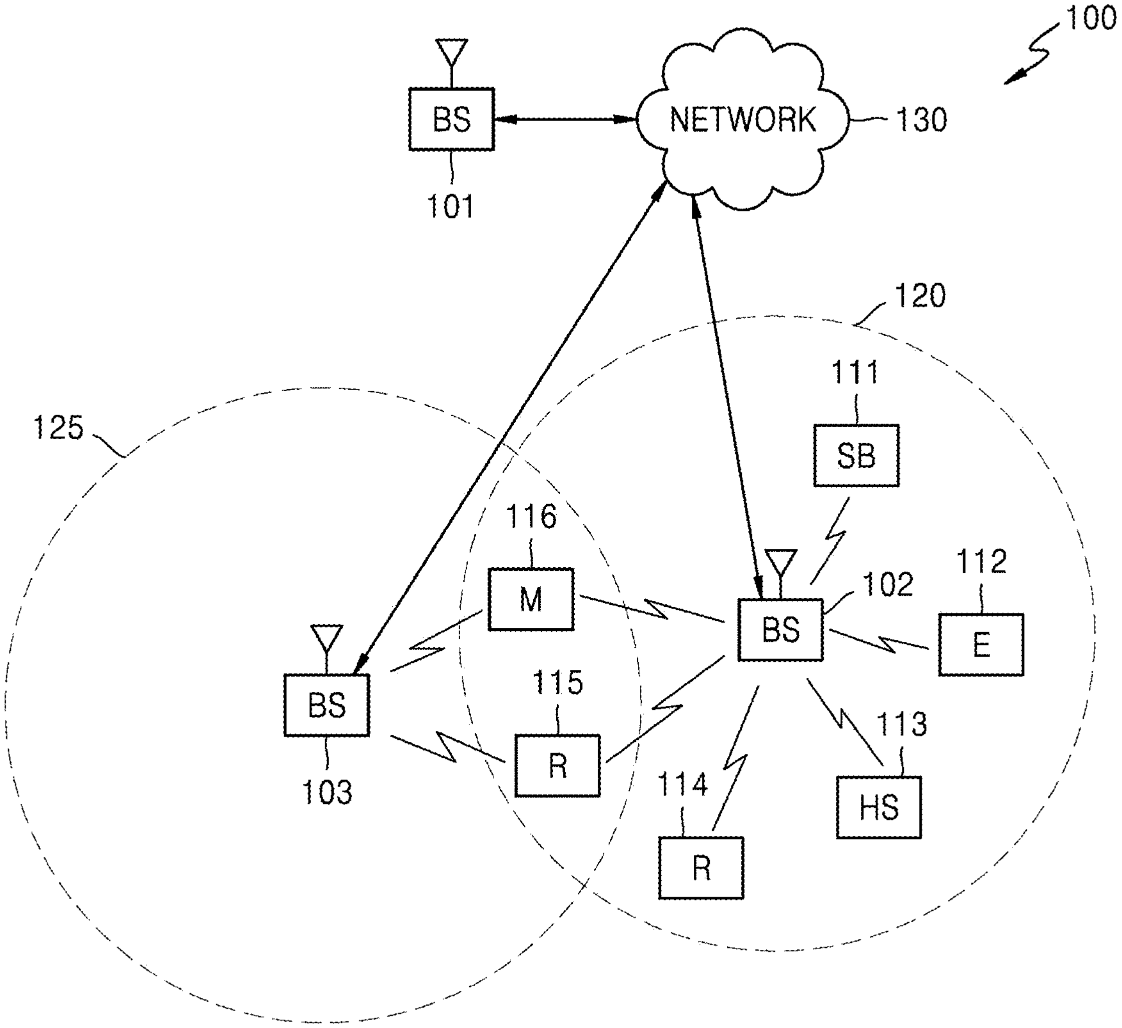
FIG. 1 illustrates an example wireless network 100 according to various embodiments of the present disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which may be used in various embodiments of the disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the disclosure belongs. Such terms as those defined in a generally used dictionary are to be interpreted to have the meanings equal to the contextual meanings in the relevant field of art, and are not to be interpreted to have ideal or excessively formal meanings unless clearly defined in the disclosure.

In the Long Term Evolution (LTE) technology, sidelink communication includes two main mechanisms, which are Device to Device (D2D) direct communication and Vehicle to everything (Vehicle to Vehicle/Infrastructure/Pedestrian/Network, V2X), among which V2X is designed on the basis of D2D technology, which is superior to D2D in data rate, delay, reliability and link capacity, and is the most representative sidelink communication technology in LTE technology.

As the evolution technology of LTE, the fifth generation (5G) new radio (NR) system also includes the further evolution of sidelink communication. As the evolution version of LTE V2X technology, NR V2X technology is formulated in version 16, and its performance in all aspects is superior. In Release 17, the 5G NR system is expected to further extend the application scenarios of NR V2X to other wider application scenarios, such as commercial sidelink communication and Public Safety (PS) scenarios. In Release 18, 5G NR SL will further introduce the evolution corresponding to other scenarios and applications, such as SL technology in high frequency (FR2), unlicensed frequency band, and SL technology corresponding to specific applications such as positioning.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

FIG. 1 illustrates an example wireless network 100 according to an embodiment of the disclosure.

The embodiment of the wireless network 100 shown in FIG. 1 is for illustration only. Other embodiments of the wireless network 100 may be used without departing from the scope of the disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" may be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" may be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

In addition, according to the embodiment in the disclosure, "node" or "node device" may be used instead of "user equipment" or "UE". According to another embodiment in the disclosure, "node" or "node device" may be used instead of "base station".

gNB 102 provides wireless broadband access to the network 130 for a first multiple User Equipment (UEs) within a coverage area 120 of gNB 102. The first multiple UEs include a UE 111, which may be located in a Small Business (SB); a UE 112, which may be located in an enterprise (E); a UE 113, which may be located in a Wi-Fi Hotspot (HS); a UE 114, which may be located in a first residence (R); a UE 115, which may be located in a second residence (R); a UE 116, which may be a mobile device (M), such as a cellular phone, a wireless laptop computer, a wireless personal digital assistant (PDA), etc. GNB 103 provides wireless broadband access to network 130 for a second multiple UEs within a coverage area 125 of gNB 103. The second multiple UEs include a UE 115 and a UE 116. In some embodiments, one or more of gNBs 101-103 may communicate with each other and with UEs 111-116 using 5G, Long Term Evolution (LTE), LTE-advanced (LTE-A), WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a two-dimensional (2D) antenna array as described in embodiments of the disclosure. In some embodiments, one or more of gNB 101, gNB 102, and gNB 103 support codebook designs and structures for systems with 2D antenna arrays.

Although FIG. 1 illustrates an example of the wireless network 100, various changes may be made to FIG. 1. The wireless network 100 may include any number of gNBs and any number of UEs in any suitable arrangement, for example. Furthermore, gNB 101 may directly communicate with any number of UEs and provide wireless broadband access to the network 130 for those UEs. Similarly, each gNB 102-103 may directly communicate with the network 130 and provide direct wireless broadband access to the network 130 for the UEs. In addition, gNB 101, 102 and/or 103 may provide access to other or additional external networks, such as external telephone networks or other types of data networks.

Figure 2A:
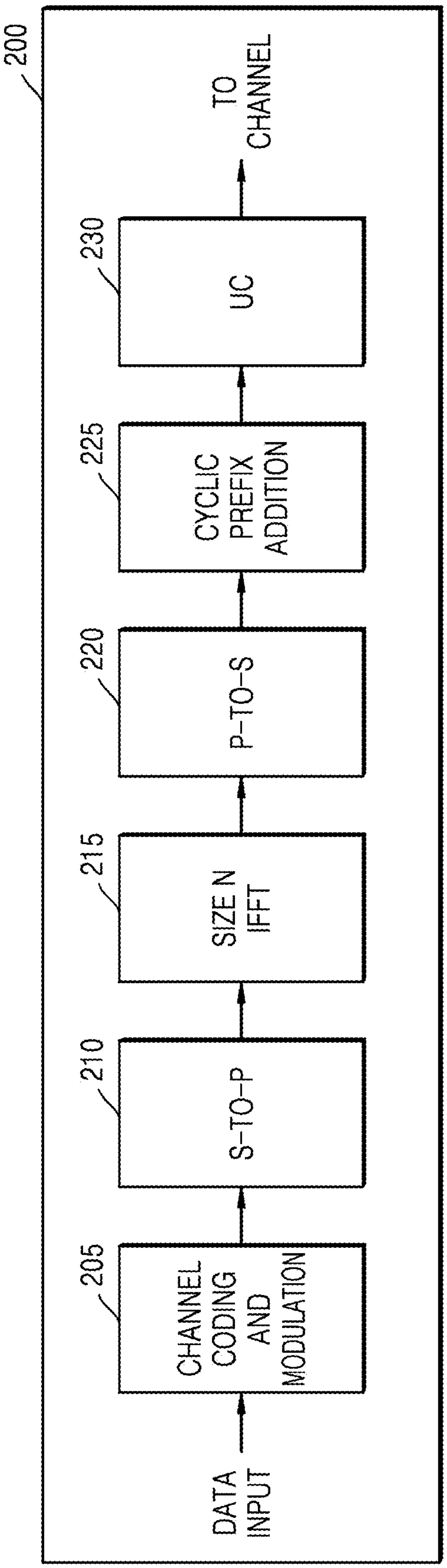
FIG. 2A illustrates example wireless transmission path according to the present disclosure.
Figure 2B:
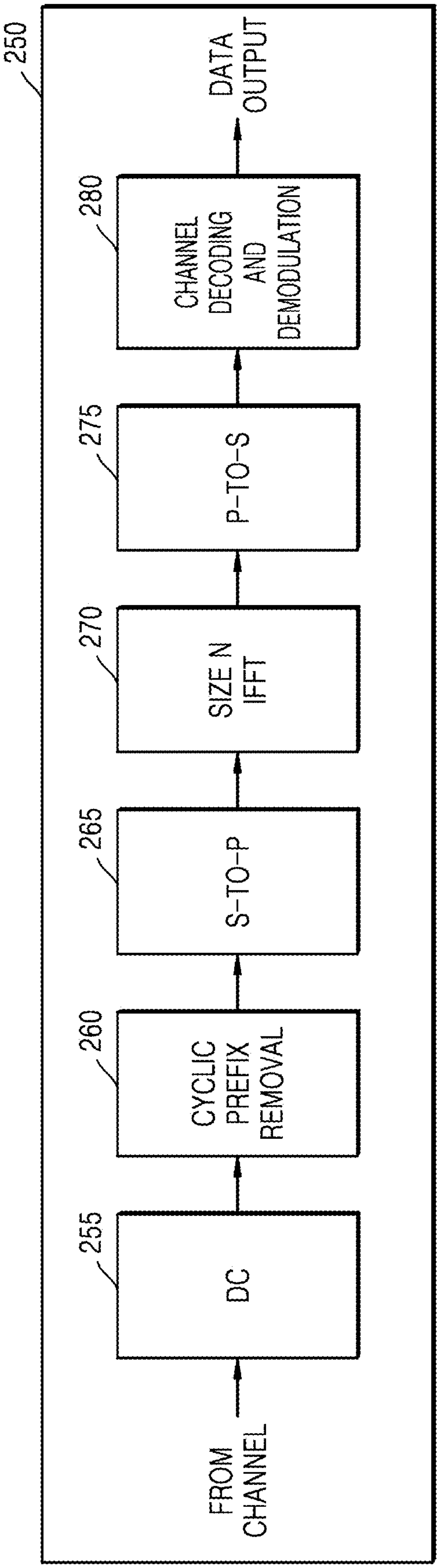
FIG. 2B illustrates example wireless reception path according to the present disclosure.

FIGS. 2A and 2B illustrate example wireless transmission and reception paths according to various embodiments of the disclosure.

In the following description, the transmission path 200 may be described as being implemented in a gNB, such as gNB 102, and the reception path 250 may be described as being implemented in a UE, such as UE 116. However, it should be understood that the reception path 250 may be implemented in a gNB and the transmission path 200 may be implemented in a UE. In some embodiments, the reception path 250 is configured to support codebook designs and structures for systems with 2D antenna arrays as described in embodiments of the disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to a radio frequency (RF) frequency for transmission via a wireless channel. The signal may also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B may be implemented using only hardware, or using a combination of hardware and software/firmware. As a specific example, at least some of the components in FIGS. 2Aa and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms may be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B may be combined, further subdivided or omitted, and additional components may be added according to specific requirements. Furthermore, FIGS. 2A and 2B are intended to illustrate examples of types of transmission and reception paths that may be used in a wireless network. Any other suitable architecture may be used to support wireless communication in a wireless network.

Figure 3A:
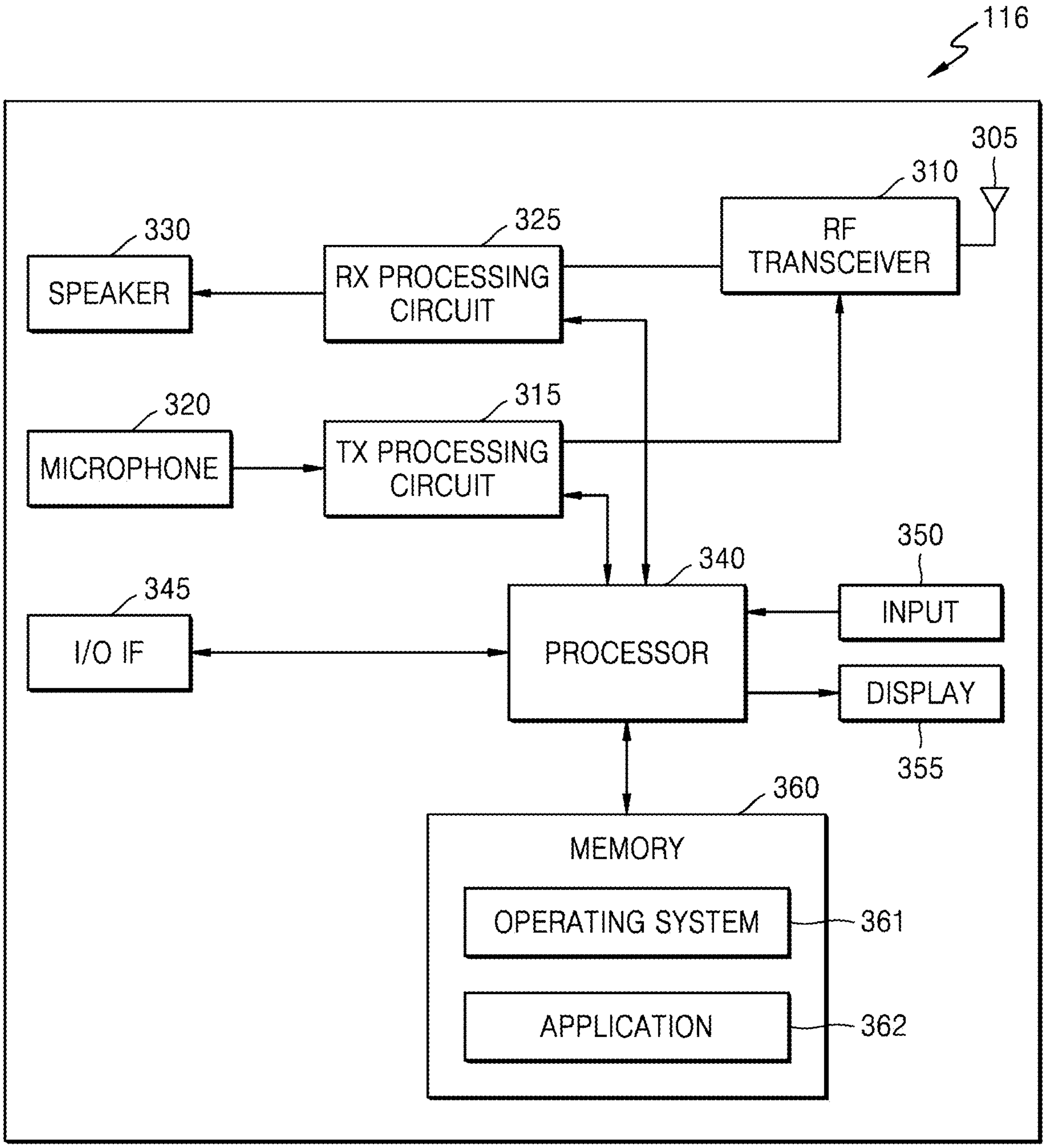
FIG. 3A illustrates an example of UE according to the present disclosure.

FIG. 3A illustrates an example UE 116 according to an embodiment of the disclosure.

The embodiment of UE 116 shown in FIG. 3A is for illustration only, and UEs 111-115 of FIG. 1 may have the same or similar configuration. However, a UE has various configurations, and FIG. 3A does not limit the scope of the disclosure to any specific implementation of the UE. For example, the UE may include a transceiver and at least one processor.

Referring to the FIG. 3A, UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 may include one or more processors or other processing devices and execute an OS 361 stored in the memory 360 in order to control the overall operation of UE 116. For example, the processor/controller 340 may control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. The processor/controller 340 may move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 may input data into UE 116 using the input device(s) 350. The display 355 may be a liquid crystal display or other display capable of presenting text and/or at least limited graphics (such as from a website). The memory 360 is coupled to the processor/controller 340. A part of the memory 360 may include a random access memory (RAM), while another part of the memory 360 may include a flash memory or other read-only memory (ROM).

Although FIG. 3A illustrates an example of UE 116, various changes may be made to FIG. 3A. For example, various components in FIG. 3A may be combined, further subdivided or omitted, and additional components may be added according to specific requirements. As a specific example, the processor/controller 340 may be divided into a plurality of processors, such as one or more central processing units (CPUs) and one or more graphics processing units (GPUs). Furthermore, although FIG. 3A illustrates that the UE 116 is configured as a mobile phone or a smart phone, UEs may be configured to operate as other types of mobile or fixed devices.

Figure 3B:
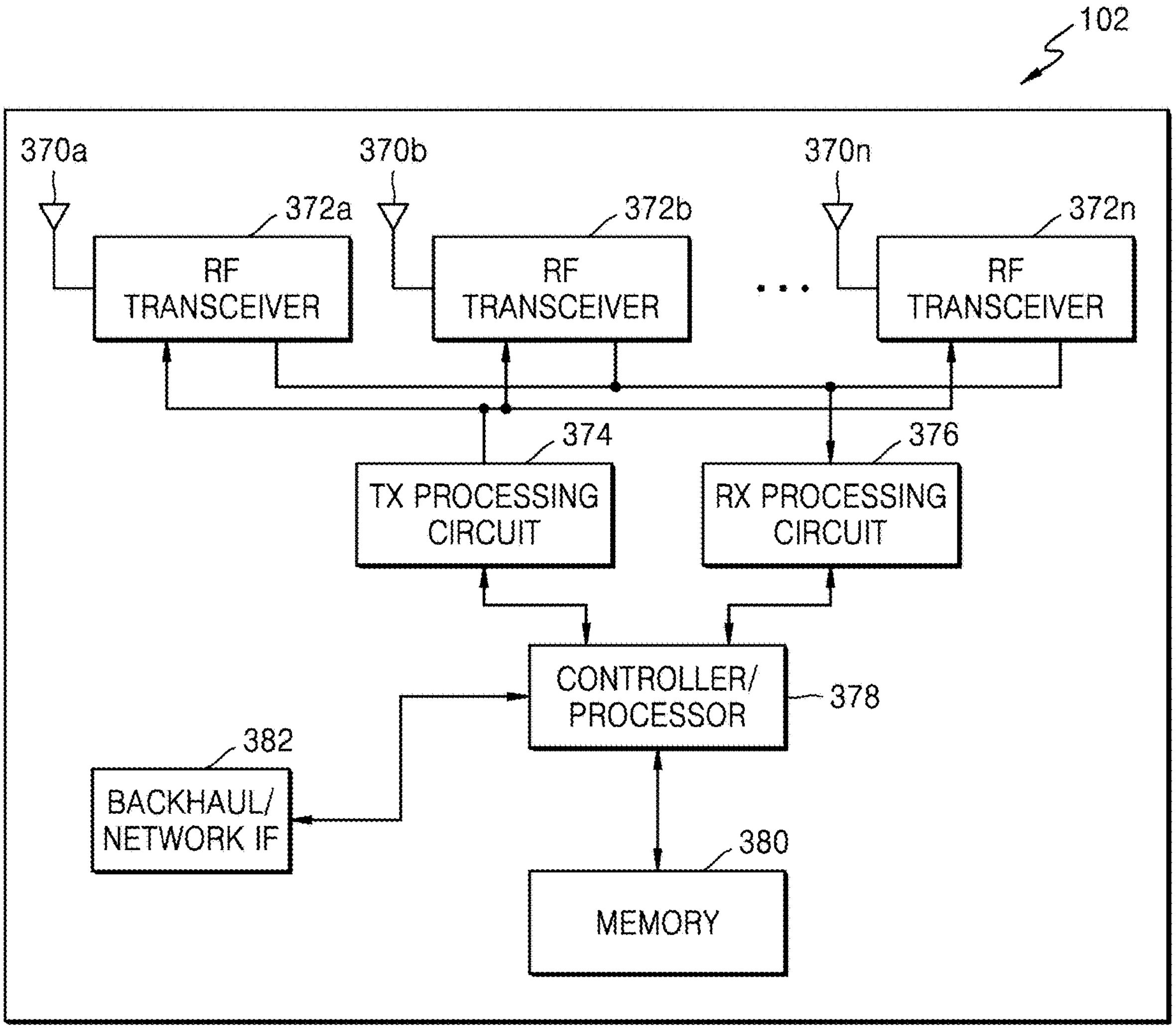
FIG. 3B illustrates an example of gNB according to the present disclosure.

FIG. 3B illustrates an example gNB 102 according to an embodiment of the disclosure.

The embodiment of gNB 102 shown in FIG. 3B is for illustration only, and other gNBs of FIG. 1 may have the same or similar configuration. However, a gNB has various configurations, and FIG. 3B does not limit the scope of the disclosure to any specific implementation of a gNB. For example, the gNB may include a transceiver and at least one processor.

It should be noted that gNB 101 and gNB 103 may include the same or similar structures as gNB 102.

Referring to FIG. 3B, gNB 102 includes a plurality of antennas 370*a*, 370*b* . . . 370*n*, a plurality of RF transceivers 372*a*, 372*b* . . . 372*n*, a transmission (TX) processing circuit 374, and a reception (RX) processing circuit 376. In certain embodiments, one or more of the plurality of antennas 370*a*-370*n* include a 2D antenna array. gNB 102 also includes a controller/processor 378, memory 380, and a backhaul or network interface 382.

RF transceivers 372*a*-372*n* receive an incoming RF signal from antennas 370*a*-370*n*, such as a signal transmitted by UEs or other gNBs. RF transceivers 372*a*-372*n* down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372*a*-372*n* receive the outgoing processed baseband or IF signal from TX processing circuit 374 and up-convert the baseband or IF signal into an RF signal transmitted via antennas 370*a*-370*n*.

The controller/processor 378 may include one or more processors or other processing devices that control the overall operation of gNB 102. For example, the controller/processor 378 may control the reception of forward channel signals and the transmission of backward channel signals through the RF transceivers 372*a*-372*n*, the RX processing circuit 376 and the TX processing circuit 374 according to well-known principles. The controller/processor 378 may also support additional functions, such as higher-level wireless communication functions. For example, the controller/processor 378 may perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 may also support channel quality measurement and reporting for systems with 2D antenna arrays as described in embodiments of the disclosure. In some embodiments, the controller/processor 378 supports communication between entities such as web real-time communications (RTCs). The controller/processor 378 may move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 may support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 may allow gNB 102 to communicate with other gNBs through wired or wireless backhaul connections. When gNB 102 is implemented as an access point, the backhaul or network interface 382 may allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 may include an RAM, while another part of the memory 380 may include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372*a*-372*n*, TX processing circuit 374 and/or RX processing circuit 376) support aggregated communication with FDD cells and TDD cells.

Although FIG. 3B illustrates an example of gNB 102, various changes may be made to FIG. 3B. For example, gNB 102 may include any number of each component shown in FIG. 3A. As a specific example, the access point may include many backhaul or network interfaces 382, and the controller/processor 378 may support routing functions to route data between different network addresses. As another specific example, although shown as including a single instance of the TX processing circuit 374 and a single instance of the RX processing circuit 376, gNB 102 may include multiple instances of each (such as one for each RF transceiver).

In the Long Term Evolution (LTE) technology, sidelink communication includes two main mechanisms, which are Device to Device (D2D) direct communication and Vehicle to everything (Vehicle to Vehicle/Infrastructure/Pedestrian/Network, V2X), among which V2X is designed on the basis of D2D technology, which is superior to D2D in data rate, delay, reliability and link capacity, and is the most representative sidelink communication technology in LTE technology. In 5G system, sidelink communication mainly includes vehicle to everything (V2X) communication at present.

As the evolution technology of LTE, the 5G NR system also includes the further evolution of sidelink communication. As the evolution version of LTE V2X technology, NR V2X technology is formulated in version 16, and its performance in all aspects is superior. In Release 17, the 5G NR system is expected to further extend the application scenarios of NR V2X to other wider application scenarios, such as commercial sidelink communication and Public Safety (PS) scenarios. In Release 18, the evolution of sidelink communication includes support to directions such as unlicensed frequency band, FR2, carrier aggregation, co-channel coexistence with LTE, and technologies in other fields such as positioning.

In the embodiment of the application, the information configured by the base station, indicated by signaling, configured by the higher layer and pre-configured includes a set of configuration information; also includes multiple sets of configuration information from which the UE selects a set of configuration information to use according to predefined condition; and also includes a set of configuration information containing a plurality of subsets from which the UE selects one subset to use according to predefined condition.

In the embodiment of this application, lower than a threshold may also be replaced by lower than or equal to a threshold, higher than (exceeding) a threshold may also be replaced by higher than or equal to a threshold, less than or equal to may also be replaced by less than, greater than or equal to or greater than; or vice versa.

Some technical solutions provided in the embodiment of this application are specifically described based on the V2X system, but its application scenario should not be limited to the V2X system in sidelink communication, but may also be applied to other sidelink transmission systems. For example, the design based on the V2X subchannel in the following embodiments may also be used for the D2D subchannel or other subchannels of sidelink transmission. The V2X resource pool in the following embodiments may also be replaced by a D2D resource pool in other sidelink transmission systems, such as D2D.

In the embodiment of this application, when the sidelink communication system is a V2X system, the terminal or UE may be a Vehicle, an Infrastructure, a Pedestrian, a node and other types of terminals or UEs.

The base station in this specification may also be replaced by other nodes, such as sidelink nodes, a specific example is the roadside station (infrastructure) UE in the sidelink system. Any mechanism applicable to the base station in this embodiment may also be similarly used in the scenarios where the base station is replaced by other sidelink nodes, and the description will not be repeated.

In this specification, slots may also be replaced with time units, candidate slots may also be replaced with candidate time units, and candidate single slot resources may also be replaced with candidate single time unit resources. In a specific example, the time unit may include a specific time length, such as several consecutive symbols.

The slot in this specification may be either a subframe or slot in the physical sense, or a subframe or slot the logical sense. Specifically, the subframe or slot in the logical sense is the subframe or slot corresponding to the resource pool of sidelink communication. For example, in the V2X system, the resource pool is defined by a repeated bitmap, which is mapped to a specific set of slots, the specific set of slots may be all slots, or all other slots except some specific slots (e.g., slots for transmitting Master Information Block (MIB)/System Information Block (SIB)). The slot indicated as "1" in the bitmap may be used for V2X transmission and belongs to the slot corresponding to the V2X resource pool; the slot indicated as "0" may not be used for V2X transmission and does not belong to the slot corresponding to the V2X resource pool.

The following is a typical application scenario to illustrate the difference between physical or logical subframes or slots: when calculating the time-domain gap between two specific channels/messages (such as PSSCH carrying sidelink data and PSFCH carrying corresponding feedback information), it is assumed that the gap is N slots. If physical subframes or slots are calculated, the N slots correspond to the absolute time length of N*x milliseconds in the time-domain, and x is the time length of the physical slot (subframe) under the numerology of the scenario in millisecond. Otherwise, if the logical subframes or slots are calculated, take the sidelink resource pool defined by the bitmap as an example, the gap of the N slots corresponds to the N slots indicated as "1" in the bitmap, and the absolute time length of the gap changes with the specific configuration of the sidelink communication resource pool without a fixed value.

Further, the slot in this specification may be a complete slot or several symbols corresponding to sidelink communication in one slot. For example, when the sidelink communication is configured to be performed on the X1-X2 symbols of each slot, the slot in the following embodiment is the X1-X2 symbols in the slot in this scenario; alternatively, when the sidelink communication is configured as mini-slot transmission, the slot in the following embodiments is mini-slot defined or configured in the sidelink system rather than the slot in the NR system; alternatively, when the sidelink communication is configured as symbol level transmission, the slots in the following embodiments may be replaced with symbols, or may be replaced with N symbols with time-domain granularity as symbol level transmission.

In order to make the purpose, technical solutions and advantages of this application clearer, the embodiment of this application will be further described in detail with the accompanying drawings.

In this specification, a UE obtains a configuration or obtains a pre-defined/(pre) configured parameter, including at least one of obtaining from higher layer, obtaining from a base station, obtaining from other UEs. For example, the second UE indicates a parameter to the first UE through higher layer signaling and/or physical layer signaling, which in this specification may be understood as the first UE obtaining the configuration of the parameter from the second UE.

When the UE obtains or uses a threshold in this specification, the threshold may be predefined and/or configured, and for the configured threshold, the configuration may be at least one of higher layer configured (e.g. radio resource control (RRC)/medium access control (MAC) configuration), base station configured, configured by other UEs, pre-configured.

In this specification, a slot may also be replaced by other time units, e.g., Orthogonal Frequency Division Multiplexing (OFDM) symbol, mini-slot, subframe, OFDM symbol, etc. The subchannel may also be replaced by other frequency-domain units, such as physical resource block (PRB), and the like.

And the text and drawings are only provided as examples to help readers understand this disclosure. They are not intended and should not be construed to limit the scope of the disclosure in any way. Although some embodiments and examples have been provided, based on the disclosure herein, it is obvious to those skilled in the art that changes may be made to the illustrated embodiments and examples without departing from the scope of this disclosure.

In the sidelink communication system of LTE and NR, the sidelink communication system is designed mainly based on the requirements of specific D2D and vehicle business scenarios, and the frequency bands used by the system are mainly concentrated on specific licensed frequency bands, such as intelligent transportation systems (ITS) frequency bands dedicated for vehicle traffic. With the development of 5G technology, the business modes for sidelink communication are growing, so it is necessary to enhance the sidelink communication technology so that it may be applied to a wider range of application scenarios, such as extended reality (XR), industrial internet of things (IIoT), reduced capability (RedCap) and so on. For the business requirements of some future application scenarios, the transmission rate, latency and reliability achieved by the current sidelink communication technology are needed to be further enhanced. A feasible method is to apply the sidelink communication to more frequency bands, such as unlicensed frequency bands, to increase the transmission rate and improve reliability supported by the sidelink system by increasing bandwidth, and reduce the service transmission latency through high-frequency communication. However, the current sidelink communication system has not discussed the possibility of sidelink communication in the unlicensed frequency bands, and has not introduced any enhancement mechanism for the unlicensed frequency bands.

In the system of low frequency bands, CSI-RS in the sidelink communication reference signal is mapped to the data channel and transmitted, the design is mainly to reduce the transmissions of the independent reference signal and improve the efficiency of resource occupation. When the sidelink communication system operates at a high frequency bands, beams need to be obtained and maintained between communicating UEs, and thus more CSI-RSs for beam measurement are required in the system, and thus a transmission method for reference signal including an independent CSI-RS needs to be introduced, and a reasonable channel structure needs to be designed.

In a sidelink communication system of a high frequency bands, if wireless communication is needed between a first UE and a second UE, both the first UE and the second UE need to determine beams for communication with each other, transmit and receive sidelink signals/channels to and from each other using the beams. The beams further include respective transmission beams and respective reception beams for the first UE and the second UE.

The UE may generally determine the beams based on measurement results on the beams. A method for measuring the beam is that the transmitting UE transmits a reference signal with its transmission beam, the receiving UE performs measurement on the reference signal and provides the feedback results to the transmitting UE, the transmitting UE and the receiving UE select the beam corresponding to the reference signal with the best communication quality based on the measurement results. In the sidelink system of FR2, the reference signal may be S-SSB, CSI-RS, DMRS.

In the sidelink system of FR1, since there is no need to perform beam measurements, CSI-RS may typically be used to measure the channel quality of the FR1 air interface, CSI-RS is defined to be transmitted along with data multiplexed on the same time-frequency resource for the purpose of saving overhead. In the sidelink system of FR2, in order to support the increase in the number of CSI-RSs caused by the demand for beam measurement, and to support the purpose of transmitting and receiving CSI-RSs more flexibly to achieve instant channel measurement, in addition to CSI-RSs multiplexed on data transmission in FR1 (also referred to as non-independent CSI-RSs), there is a need to support CSI-RSs that may not be multiplexed with data (also referred to as independent CSI-RSs). CSI-RS may be transmitted on the same slot and subchannel as PSCCH, PSFCH, and possibly PSSCH, which may be used to transmit a second stage SCI and may be used to transmit higher layer control information not belonging to the data, such as MAC control element (CE).

The disclosure provides a method for transmitting CSI-RS in a sidelink system, the method provides a physical layer structure to support multiplexing of CSI-RS resources on a same slot. For example, it is allowed to include multiple CSI-RS resources within a slot for transmission of multiple CSI-RSs.

In addition, the disclosure also provides a physical layer structure of other channels associated with CSI-RS, such as PSCCH, PSFCH, PSSCH, and the like, and provides some methods using the above-described physical layer structure.

Multiple CSI-RS resource patterns are supported in the sidelink communication system, and a pattern may use some but not all of the REs of a particular pattern in its transmission resources. Therefore, when CSI-RS patterns used in the system do not overlap with each other, in order to improve resource utilization efficiency, different CSI-RS resources corresponding to different patterns may be multiplexed in a same time-frequency resource, e.g., a same slot and subchannel. To support the design of multiplexing different CSI-RS resources in a same slot and subchannel, it is necessary to design the corresponding physical layer structure of PSCCH resources.

Further, when CSI-RS transmission may feed back the measurement results through PSFCH, a physical layer structure of PSFCH resources corresponding to the above-described multiplexed CSI-RSs needs to be designed.

In addition, since different CSI-RS resources may be used by different UEs, may be used by different beams of the same UE, there is also a need to provide methods of how to use CSI-RS resources and methods of how to determine transmission and reception beams based on the physical layer structure and the use of CSI-RS resources.

In the specification, the multiplexing type of signals/channels includes: the multiplexing type between physical layer resources corresponding to the signals/channels may be the same as or different from the multiplexing type between actually transmitted signals/channels, in order to illustrate how different resources in the physical layer structure used by the system are multiplexed in a slot and subchannel; and/or the multiplexing type between the transmissions of the signals/channels may be a subset of the multiplexing type between the physical layer resources, in order to illustrate what way the UE selects the resources multiplexed in the physical layer structure for the actual transmission.

Methods for a transmitting UE of some signals/channels determines resources for automatic gain control (AGC) and/or transmits signals/channels corresponding to AGC are provided in the specification. Since AGC is a method performed by the receiving UE to adjust the receiver power range, the processing of the AGC by the transmitting end UE includes using a specific signal/channel mapping method on resources corresponding to AGC at the time of generating signals/channels, which may be used to allow the receiving UE to perform AGC on the resources. A specific example is that the transmitting UE processes AGC symbol by transmitting a duplication of the symbol of another sidelink signal/channel on that symbol, e.g., transmitting a duplication of the first CSI-RS symbol on the AGC symbol before CSI-RS, transmitting a duplication of the first PSCCH symbol on the AGC symbol before PSCCH, etc.; and the same transmission power is maintained on the AGC symbol and the symbol of the signals/channels following it.

For convenience of description, the above-described specific method is not provided in every method related to the processing of the AGC by the transmitting UE in this specification, but is referred to in terms of determining resources for the AGC and transmitting signals/channels corresponding to the AGC. The behavior of the transmitting UE determining resources for AGC resources and to transmitting signals/channels corresponding to AGC in this specification may be replaced with the above-described specific processing method of the transmitting UE for resources for AGC. For example, the UE determining an AGC symbol before CSI-RS may be replaced by the UE determining a symbol, the symbol is before CSI-RS and used for the UE to transmits duplication of the first symbol of CSI-RS and uses the same transmission power as CSI-RS on that symbol.

Figure 4:
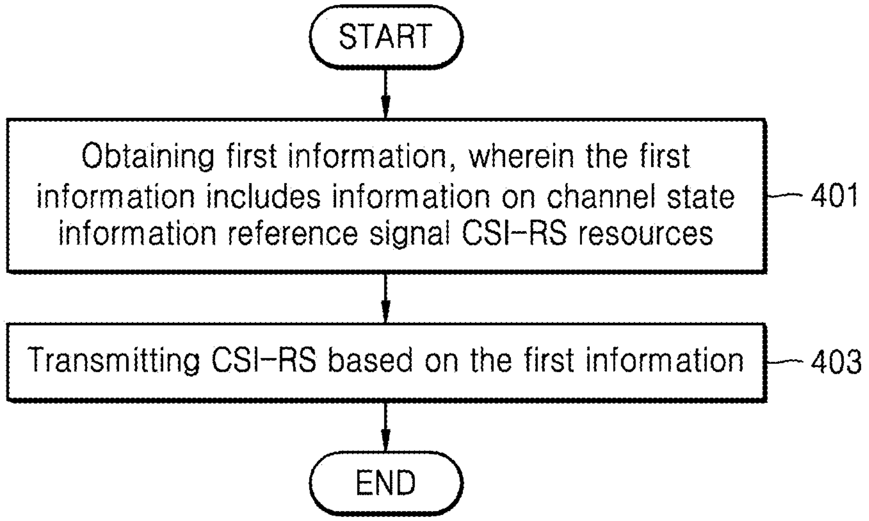
FIG. 4 is a flowchart illustrating a method according to an example embodiment of the present disclosure.

FIG. 4 illustrates a flowchart of a method performed by a first UE according to an embodiment of the disclosure. The first node may be used instead of the first UE.

At operation 401, the first UE obtains the first information, wherein the first information includes information on CSI-RS resources;

At operation 403, the first UE transmits CSI-RS based on the first information.

The first UE may perform the sidelink transmission, including transmitting CSI-RS, based on a physical layer structure (or physical layer slot structure, physical layer frame structure, physical layer other time unit structure), the physical layer structure may be referred to as a first structure. The first structure includes a physical layer structure corresponding to at least one of:

Resource corresponding to AGC, which may be at least one AGC symbol;

Gap resource, which may be at least one gap symbol;

At least one PSCCH resource (which may also be referred to as a PSCCH occasion, resource and occasion may be interchanged in this specification);

At least one CSI-RS resource.

Based on the first information, the first UE may also transmit or receive at least one of the following signals/channels using the first structure: PSSCH, PSFCH.

Wherein PSFCH may be used to feedback the measurement results on CSI-RS.

Wherein the first information includes at least one of:

Multiplexing type between CSI-RSs; further including time division multiplexing (TDM) and/or comb-based multiplexing; The multiplexing type may be the multiplexing type of CSI-RSs indicated in resource pool configuration information. The information on the CSI-RS resources may be used instead of the resource pool configuration information. The multiplexing type of CSI-RSs in the specification mainly refers to the multiplexing type between CSI-RSs in a same subchannel, and CSI-RSs may still use frequency division multiplexing (FDM) in different subchannels without affecting the technical approach provided in the specification;

Multiplexing type between PSCCHs; wherein PSCCH may be different PSCCH resources corresponding to different CSI-RSs; further including TDM and/or FDM; the multiplexing type may be the multiplexing type of PSCCHs indicated in the resource pool configuration information; The information on the PSCCH resources may be used instead of the resource pool configuration information.

Multiplexing type between PSCCH and CSI-RS; wherein PSCCH and CSI-RS may be mutually associated PSCCH and CSI-RS, wherein CSI-RS associated with PSCCH may be CSI-RS indicated in PSCCH; further including TDM and/or FDM; the multiplexing type may be the multiplexing type of PSCCH and CSI-RS indicated in the resource pool configuration information;

Multiplexing type between CSI-RS and PSSCH; further including when CSI-RS and PSSCH use or may use the same transmission beam, CSI-RS and PSSCH are TDM and/or FDM; and/or when CSI-RS and PSSCH use or may use different transmission beams, CSI-RS is TDM with PSSCH;

Information on the resource positions of PSCCH and CSI-RS, including at least one of: the time-domain positions of at least one PSCCH resource and CSI-RS resource to which PSCCH resource corresponds are consecutive (e.g., on consecutive OFDM symbols), there is a gap between the time-domain positions of at least one PSCCH resource and CSI-RS resource to which PSCCH resource corresponds (e.g., on non-consecutive OFDM symbols), the time-domain positions of a multiple PSCCH resources within a slot are each before the time-domain positions of the multiple CSI-RS resources, the time-domain position of at least one PSCCH resource within a slot is before the time-domain position of CSI-RS resource to which PSCCH resource corresponds but may be before or after the time-domain positions of other PSCCH resources and/or CSI-RS resources; wherein CSI-RS resource corresponding to PSCCH resource is used for transmitting CSI-RS associated with PSCCH;

Positions of resources for AGC, and/or information for determining positions of resources corresponding to AGC; further including the position of the AGC symbols and/or information used to determine the positions of the AGC symbols;

Positions of resources corresponding to gap, and/or information used to determine positions of resources corresponding to gap; further including positions of gap symbols and/or information for determining the positions of gap symbols;

Information on CSI-RS resources;

Information on UE capability, the UE capability may be the capability of the first UE and/or a UE to which the destination ID of CSI-RS corresponds, further including capability about AGC processing time;

Information on PSSCH resources, further including at least one of: a time-domain resource starting position and/or a time-domain resource ending position of PSSCH resources in a slot, a time-domain resource size of PSSCH resources (e.g., a number of symbols used by PSSCH resources), and/or a maximum threshold and/or a minimum threshold of the time-domain resource size;

Information on Demodulation Reference Signal, DMRS, resources, including position of DMRS time and/or frequency-domain and/or code domain resources (code domain resources may correspond to parameters used by DMRS sequences, e.g. indices or initialization factors, etc.), further including information of different DMRS resources corresponding to different PSSCH resource locations/sizes;

Information on the resource pool type, further including that the resource pool is a resource pool used only for CSI-RS or only for beam measurement, or that the resource pool is a resource pool available for CSI-RS/beam measurement and also available for communication;

Information on PSFCH resources, further including at least one of a period of PSFCH resources, a time-domain resource starting position and/or a time-domain resource ending position of PSFCH resources in a slot, a time-domain resource size of PSFCH resources (e.g., a number of symbols used by PSSCH resource) and/or a maximum threshold and/or a minimum threshold of the time-domain resource size, a frequency-domain resource starting position and/or a frequency-domain resource ending position and/or number of PSFCH resources, a frequency-domain resource size of PSFCH resources, sequence generation parameters of PSFCH resources;

Multiplexing type between PSFCHs; further including TDM and/or FDM; the multiplexing type may be multiplexing type of PSFCHs indicated in the resource pool configuration information. The information on the PSFCH resources may be used instead of the resource pool configuration information.

The multiplexing type of PSFCHs in this specification mainly refers to the multiplexing type between CSI-RSs in a same subchannel, and PSFCH may still use multiplexing type of FDM in different subchannels without affecting the technical approach provided in this specification;

Correspondence between PSFCH resources and CSI-RS resources.

Wherein the first information includes at least one of information in resource pool configuration information in UE-specific configuration, higher layer configured information, base station configured information, pre-configured information, and/or includes pre-defined information. For example, information such as pattern of CSI resources, multiplexing type of CSI and PSSCH, multiplexing type of PSCCH is configured in the resource pool configuration, and for further example, information on resource positions of PSCCH and CSI-RS, the first symbol in the slot being used as AGC symbol, the last symbol in the slot being used as gap symbol is predefined.

Optionally, the first structure further includes at least one of:

At least one symbol used for at least one of AGC, gap, PSCCH, CSI-RS, PSSCH, PSFCH, DMRS;

If at least one symbol is used for PSCCH, at least one of starting position, ending position, size of time and/or frequency-domain of at least one PSCCH resource on that symbol; further, may be at least one of starting position, ending position, size in time and/or frequency-domain of at least one PSCCH resource in at least one subchannel on the symbol and/or at least one PSCCH resource in a resource pool on the symbol;

If at least one symbol is used for PSFCH, at least one of starting position, ending position, size of time and/or frequency-domain of at least one PSFCH resource on that symbol; further, may be at least one of starting position, ending position, size in time and/or frequency-domain of at least one PSFCH resource in at least one subchannel on the symbol and/or at least one PSFCH resource in a resource pool on the symbol;

Correspondence between at least one PSCCH resource and at least one CSI-RS resource;

Correspondence between at least one PSFCH resource and at least one CSI-RS resource.

Optionally, the first structure is based on the first information. Further, the first UE determining the first structure includes at least one of: determining whether there are resources for AGC before at least one of PSCCH resources, PSSCH resources, PSFCH resources, determining whether there are resources for AGC before CSI-RS resources, determining whether there are resource for gap after at least one of PSCCH resources, PSSCH resources, PSFCH resources, and determining whether there are resource for gap after CSI-RS resources.

Optionally, determining whether there are resources for AGC before PSCCH resources includes: when the at least one first PSCCH resource and the at least one second PSCCH resource are TDM, and/or when the at least one first PSCCH resource and the at least one second PSCCH resource are TDM and the first PSCCH resource and the second PSCCH resource are not configured to be used by the same transmitting UE, there are resources for AGC, e.g., at least one AGC symbol, between the first PSCCH resource and the second PSCCH resource; the at least one AGC symbol may be located on an adjacent symbol before a starting symbol of the later one of the first PSCCH resource and second PSCCH resource. Optionally, if the first PSCCH resource and the second PSCCH resource are consecutive in time-domain (consecutive herein means that there are no other PSCCH resources/resources for other sidelink signal channels between the time-domain positions of the first PSCCH resource and the second PSCCH resource, but there may be resources for AGC or gap), there are resources for AGC between the first PSCCH resource and the second PSCCH resource, e.g., an OFDM symbol for AGC. In this method, the first PSCCH resource may include one or more resources, and/or the second PSCCH resource may include one or more resources; when multiple resources are included, the multiple resources may be FDM, and at this time the multiplexing type of the PSCCH is TDM and FDM.

Optionally, determining whether there are resources for AGC before PSFCH resources includes: when the at least one first PSFCH resource and the at least one second PSFCH resource are TDM, and/or when the corresponding PSSCH resources of the at least one first PSFCH resource and the at least one second PSFCH include different resources, there are resources for AGC, e.g., at least one AGC symbol, between the first PSFCH and the second PSFCH resources; the at least one AGC symbol may be located on an adjacent symbol before a starting symbol of the later one of the first and second PSFCH resources. Optionally, if the first PSFCH resource and the second PSFCH resource are consecutive in time-domain (consecutive herein means that there are no other PSFCH resources/resources for other sidelink signal channels between the time-domain positions of the first PSFCH resource and the second PSFCH resource, but there may be resources for AGC or gap), there are resources for AGC between the first PSFCH resource and the second PSFCH resource, e.g., an OFDM symbol for AGC. In this method, the first PSFCH resource may include one or more resources and/or the second PSFCH resource may include one or more resources; when multiple resources are included, the multiple resources may be FDM, and at this time the multiplexing type of the PSFCH is TDM and FDM.

Optionally, determining whether there are resources for AGC before CSI-RS resources includes: when the at least one first CSI-RS resource and the at least one second CSI-RS resource are TDM, and/or when the at least one first CSI-RS resource and the at least one second CSI-RS resource may be used by different UEs for transmitting CSI-RSs thereon and/or by the same UE for transmitting CSI-RSs thereon with different beams, there are resources for AGC, e.g., at least one AGC symbol, between the first CSI-RS resource and the second CSI-RS resource; the at least one AGC symbol may be located one symbol before the starting symbol of the later one of the first and second CSI-RS resources. Optionally, if the first CSI-RS resource and the second CSI-RS resource are consecutive in time-domain (consecutive herein means that there is no other PSCCH resource/CSI-RS resource/resource for other side-link signal channels between the time-domain positions of the first CSI-RS resource and the second CSI-RS resource, but there may be resources for AGC or gap), there are resources for AGC between the first CSI-RS resource and the second CSI-RS resource, e.g., an OFDM symbol for AGC. In this method, the first CSI-RS resource may include one or more resources and/or the second CSI-RS resource may include one or more resources.

Optionally, determining whether there are resources for AGC before CSI-RS resources includes: when at least one third CSI-RS resource and at least one third PSCCH resource are TDM, and the third PSCCH resource includes at least one PSCCH resource whose corresponding CSI-RS resource does not belong to the third CSI-RS resource (or the third CSI-RS resource includes at least one CSI-RS resource whose corresponding PSCCH resource does not belong to the third PSCCH resource), there are resources for AGC, e.g., at least one AGC symbol, between the third CSI-RS resource and the third PSCCH resource; Accordingly, when the at least one third CSI-RS and the at least one third PSCCH resource are TDM, and any one of the third PSCCH resource corresponds to at least one of the third CSI-RS resource (or any one of the third CSI-RS resource corresponds to at least one of the third PSCCH resource), there are no resources for AGC between the third CSI-RS resource and the third PSCCH resource, or the an adjacent symbol before the starting symbol of the later one resource between the third PSCCH resource and the third CSI-RS resource is not used for AGC; and/or, when the at least one third CSI-RS resource and the at least one third PSCCH resource are TDM, and at least two PSCCH resources in the slot are TDM and/or at least two CSI-RS resources in the slot are TDM, there are resources for AGC between the third CSI-RS resource and the third PSCCH resource, e.g., at least one AGC symbol; The at least one AGC symbol may be located an adjacent symbol before a starting symbol of the later one between the third PSCCH resource and the third CSI-RS resource. Optionally, if the third CSI-RS resource and the third PSCCH resource are consecutive in time-domain (consecutive herein means that there is no other PSCCH resource/CSI-RS resource/resource for other sidelink signal channels between the time-domain positions of the third CSI-RS resource and the third PSCCH resource, but there may be resources for AGC or gap), there are resources for AGC between the third CSI-RS resource and the third PSCCH resource, e.g., an OFDM symbol for AGC. In this method, the third CSI-RS resource may include one or more resources, and when the third CSI-RS resource includes multiple resources, the multiple resources may be comb-based multiplexing; and/or the third PSCCH resource may include one or more resources, and when including multiple resources, the multiple resources may be FDM.

Optionally, determining whether there are resources for AGC before CSI-RS and/or PSSCH resources includes: when the at least one third CSI-RS resource and the at least one PSSCH resource may be used by different UEs for transmission and/or may be used by the same UE for transmission using different transmission beams, there are resources for AGC before CSI-RS and/or PSSCH resources. Further, if CSI-RS and PSSCH resources are TDM, the resources for AGC are located before the later one of the CSI-RS and PSSCH resources; if CSI-RS and PSSCH resources are overlapped in time-domain and the time-domain starting positions are different and/or the time-domain ending positions are different, the resources for AGC are located before the starting symbol and/or after the ending symbol of at least one of the CSI-RS and PSSCH resources, e.g., CSI-RS is mapped on partial REs in a few symbols in the middle of PSSCH resource, the resources for AGC are located before the starting symbol of CSI-RS and/or after the ending symbol of CSI-RS. Further, if the resource pool configuration includes that the UE may use different transmission beams to transmit on CSI-RS resources and on PSSCH resources, the actual transmission of the first UE, regardless of whether different or the same transmission beam is used, the used first structure includes the resources for AGC; Optionally, if the resource pool configuration includes that the UE may transmit on CSI-RS resources and PSSCH resources using different transmission beams, the resources for AGC are included in the used first structure when the actual transmission of the first UE uses different transmission beams, the resources for AGC are not included in the used first structure when the same transmission beam is used, and SCI and/or higher layer signaling indicating that the transmission does not includes the resources for AGC.

Optionally, determining whether there are resources for AGC before CSI-RS resources includes: when the at least one fourth CSI-RS resource and the at least one fourth PSCCH and/or PSSCH resource are TDM and the first condition is also met, there are resources for AGC, e.g., at least one AGC symbol, between the fourth CSI-RS resource and the fourth PSCCH and/or PSSCH resource; the at least one AGC symbol may be located on an adjacent symbol before the starting symbol of the later one between the fourth PSCCH and/or PSSCH resource and the fourth CSI-RS resource. The first condition includes at least one of: a first transmission power of the first UE on the fourth PSCCH and/or PSSCH resource is different from a second transmission power on the fourth CSI-RS resource, the first transmission power and/or the second transmission power reaches a maximum value of transmission power (e.g., 23 dBm), a value of relevant parameters used to calculate the first transmission power and/or the second transmission power exceed a threshold or comply with a predetermined threshold range, the first transmission power and/or the second transmission power exceeds or reaches a power threshold, a frequency-domain size of the fourth CSI-RS resource exceeds a threshold or does not comply with a predetermined threshold range, a ratio of a frequency-domain size of the fourth CSI-RS resource and a frequency-domain size of the fourth PSCCH resource exceeds a threshold. Accordingly, the adjacent symbol before the starting symbol of the later one between the fourth PSCCH resource and the fourth CSI-RS resource is not used for AGC when at least one of the following is met: the first transmission power is the same as the second transmission power, the first transmission power and/or the second transmission power does not reach a maximum value of transmission power (e.g., 23 dBm), a value of relevant parameters used to calculate the first transmission power and/or the second transmission power do not exceed a threshold or do not comply with a predetermined threshold range, the first transmission power and/or the second transmission power is below a power threshold or complies with a predetermined threshold range, a frequency-domain size of the fourth CSI-RS resource is below a threshold, a ratio of a frequency-domain size of the fourth CSI-RS resource and a frequency-domain size of the fourth PSCCH resource is below a threshold. Wherein the power threshold and/or frequency-domain size and/or threshold of frequency-domain size ratio may be preset, and/or determined according to UE device or UE capability (e.g. capability related to maximum transmission power), and/or configured, e.g. may be a threshold set based on maximum transmission power on each RE that does not distort the transmission; may be included in the first information. Optionally, the first transmission power and/or the second transmission power includes a total transmission power over at least one time unit, e.g., a total transmission power over a symbol; and/or transmission power on at least one frequency-domain resource unit on at least one time unit, the frequency-domain resource unit including at least one of subchannel, PRB, RE. Optionally, if the fourth CSI-RS resource and the fourth PSCCH and/or PSSCH resource are consecutive in time-domain (consecutive herein means that there is no other PSCCH and/or PSSCH resource/CSI-RS resource/resource for other sidelink signal channels between the time-domain positions of the fourth CSI-RS resource and the fourth PSCCH and/or PSSCH resource, but there may be resources for AGC or gap), there are resources for AGC between the fourth CSI-RS resource and the fourth PSCCH and/or PSSCH resource, e.g., an OFDM symbol for AGC. In this method, the fourth CSI-RS resource may include one or more resources, and when the fourth CSI-RS resource includes multiple resources, the multiple resources may be comb-based multiplexing; and/or the fourth PSCCH and/or PSSCH resources may include one or more resources, and when multiple resources are included, the multiple resources may be FDM.

Optionally, determining whether there are resources for AGC before CSI-RS resources includes: when a time-domain size of CSI-RS resources exceeds a threshold, an adjacent symbol before a starting symbol of CSI-RS resources is not used for AGC; otherwise, one symbol before the starting symbol of CSI-RS resources is used for AGC or whether a symbol before CSI-RS resources is used for AGC is determined according to other methods described above. This method may be used in combination with the other methods described above and overwrite the AGC symbol before CSI-RS resources determined in the other methods described above, for example, by first determining a symbol before CSI-RS as AGC symbol using the other methods described above, and then determining whether the symbol is not used for AGC according to the time-domain size of CSI-RS resources. Optionally, when the first UE transmits CSI-RS to the second UE, the first UE determines whether to use this method according to the UE capability on AGC provided by the second UE; for example, the first UE uses this method when the AGC processing latency of the second UE is lower than a threshold value or when the UE capability level of the AGC processing latency of the second UE complies with a preset range, otherwise the first UE does not use this method. The method may also be similarly used to determine whether there are resources for AGC before PSCCH resources. The technical effect of this method is that when the time for the second UE to perform AGC is short, it is possible to use a small number of microseconds of a CSI-RS resource symbol for AGC and receive and measure CSI-RS over the time remaining within the symbol. Thus, the overhead caused by the AGC symbol may be reduced without significantly reducing the accuracy of the measurement.

The above-mentioned alternative methods for determining resources for AGC may be arbitrarily combined, for example, there are resources for AGC when the conditions in the above-mentioned at least two methods are met. The above method may also be used inversely to determine that there is no corresponding resource for AGC, e.g., when the conditions in any of the above methods are not met, or when the conditions in some of the above methods are not met.

Optionally, determining whether there are resources for the gap after PSCCH and/or PSSCH and/or PSFCH resources and/or after CSI-RS resources includes: when a second condition is met, there are resources for the gap between a fifth resource and a sixth resource, wherein the fifth resource and the sixth resource include at least one of PSCCH, PSSCH, PSFCH, CSI-RS, which may include one or more resources; and/or when the second condition is not met, there is no at least one of the above resources for gap.

The second condition includes at least one of:

The first UE may switch between transmitting and receiving in a slot, the switching may further include switching between transmitting and receiving for at least two of PSCCH, PSSCH, PSFCH, CSI-RS, or switching between transmitting and receiving for any of the sidelink signals/channels; further, whether the first UE is capable of switching between transmitting and receiving is preset, and/or determined according to UE capability, and/or indicated in the first information;

At least one fifth resource and at least one sixth resource are TDM;

The fifth resource and the sixth resource each include CSI-RS, PSCCH and/or PSSCH and/or PSFCH resources corresponding to the fifth resource and the sixth resource respectively are TDM;

The fifth resource includes CSI-RS, and at least one of the corresponding PSCCH and/or PSSCH and/or PSFCH resources is not included in the sixth resource.

The resources for the gap may be at least one gap symbol, which may be located on an adjacent symbol after an ending symbol of the earlier one between the fifth resource and the sixth resource. Optionally, if the fifth resource and the sixth resource are consecutive in time-domain (similar to the meaning explained in other methods above), there are resources for gap between them, e.g. a gap symbol.

Optionally, the correspondence between at least one PSCCH resource and at least one CSI-RS resource may be based on preset/configured criteria, including at least one of:

A PSCCH resource corresponds to a CSI-RS resource in a same slot;

A PSCCH resource corresponds to multiple CSI-RS resources in a same slot;

A PSCCH resource corresponds to multiple CSI-RS resources in multiple slots.

Wherein the relationship of the time-domain positions of PSCCH resources and the corresponding CSI-RS resources may be indicated in PSCCH resources, e.g., PSCCH resources are in slot n, CSI-RS resources are in slot n~n+a, the value of a is indicated in PSCCH. The relationship may also be preset/configured, e.g., the value of a is preset/configured in the above example.

Optionally, when N CSI-RS resources are included in each slot in the first structure, a PSCCH resource corresponds to all N*P CSI-RS resources in P slots, P is an integer greater than or equal to 1, the value of N and/or P may be preset/configured, and the value of P may be indicated in PSCCH and/or SCI. Optionally, the P slots may be consecutive; or the P slots may be periodic, e.g., the P1-th slot and the P2-th slot are separated by K slots (the subscript represents the index of the slot in the P slots), and the value of K may be at least one of preset, configured, and indicated in PSCCH/SCI.

Optionally, a PSCCH resource corresponds to H CSI-RS resources, the value of H is at least one of preset, configured, indicated in PSCCH/SCI. The H resources are a total of H CSI-RS resources in consecutive number of slots starting from the slot in which PSCCH resources are located, where the number of slots is determined by the value of H and the number of CSI-RSs in each slot in the first structure, which may be indicated in PSCCH/SCI.

The first structure provided in the specification allows multiple CSI-RS resources to be included in a subchannel in a slot, since transmission on FR2 may be spatially separated based on beams, it needs to be considered whether to define the spatial usage method of CSI-RS resources. Methods of how some UEs use or select CSI-RS are provided below. The following methods themselves may be preset, and/or configured, and which of the following methods are used in the sidelink communication system may be obtained by the UE in the first information.

Optionally, in the first structure, multiple CSI-RS resources are included in a subchannel in a slot, which may be used by the same transmitting UE for transmitting CSI-RS and may not be selected by different transmitting end UEs for transmitting CSI-RS; accordingly, when selecting CSI-RS resources, the transmitting UE selects all CSI-RS resources in each slot and subchannel, and excludes at least one CSI-RS resource in each slot and subchannel and also excludes all other CSI-RS resources in the same slot and subchannel.

Optionally, in the first structure, multiple CSI-RS resources are included in one subchannel on a slot, and the multiple CSI-RS resources may be used by the same transmitting UE for transmitting CSI-RS or may be selected by different transmitting UEs for transmitting CSI-RS; accordingly, the transmitting UE, in selecting CSI-RS resource, including generating a candidate set of resources for CSI-RS resource, and/or making corresponding channel sensing for CSI-RS resources, and/or performing exclusion of CSI-RS resources, is in units of CSI-RS resource, rather than in units of slot and subchannel as in selecting PSSCH resources in FR1 communication.

Optionally, multiple CSI-RS resources are included in a subchannel on a slot, and the multiple CSI-RS resources may be used by the same transmitting UE for transmitting CSI-RS, and further, may be used by the UE for transmitting CSI-RS using the same beam; the technical effect of this method is that it is possible to let the transmitting UE transmit repetitions of CSI-RS through the same beam, and/or let the receiving UE switch between different reception beams to measure the performance of different beam pairs. Optionally, if this method is enabled, in the first structure, there is no need to be an AGC symbol before the starting symbol of at least one or each of the multiple CSI-RS resources (but there should be an AGC symbol if the at least one CSI-RS resource with the earliest time-domain position and other types of channels such as PSCCH are consecutive in time-domain). This is because the reception power of FR2 is affected by the change in the spatial transmission direction, and the energy received by the UE of FR2 may vary regardless of whether the transmission power is changed once the transmitting UE switches the transmission beam.

Optionally, multiple CSI-RS resources are included in a subchannel on a slot, and the multiple CSI-RS resources may be used by the same transmitting UE for transmitting CSI-RS, and further may be used by the UE for transmitting CSI-RS using different beams; the technical effect of this method is that it is possible to let the transmitting UE quickly perform beam sweeping by transmitting CSI-RS on different transmission beams. Optionally, if this method is enabled, in the first structure, the multiple CSI-RS resources are TDM; and/or an adjacent symbol before the starting symbol of at least one or each of the multiple CSI-RS resources is used as AGC. This is because the reception power of FR2 is affected by the change in the spatial transmission direction, and the energy received by the UE of FR2 may vary regardless of whether the transmission power is changed once the transmitting UE switches the transmission beam.

Optionally, multiple CSI-RS resources are included in a subchannel on a slot, and the multiple CSI-RS resources may be used by the same receiving UE for receiving CSI-RS, and further may be used by the UE for receiving CSI-RS using the same beam; the technical effect of this method is that it is possible to let the transmitting UE switch between different transmission beams while the receiving UE remains unchanged in the same slot, thereby easily achieving the effect of possible beam combinations in the traversal beam speed sweep. Optionally, the multiple CSI-RS resources may be TDM and/or comb-based multiplexing, wherein comb-based multiplexing includes the OFDM symbols and/or PRBs used by the multiple CSI-RS are same, but the REs used by the multiple CSI-RS are non-overlapping.

How the first UE uses the first structure based on the first information is explained below in conjunction with a specific example. In the following drawings, CSI-RS resources and PSCCH resources are distinguished by patterns, and different patterns correspond to different resources, and CSI-RS resources and PSCCH resources of the same pattern are corresponding resources.

Figure 5A:
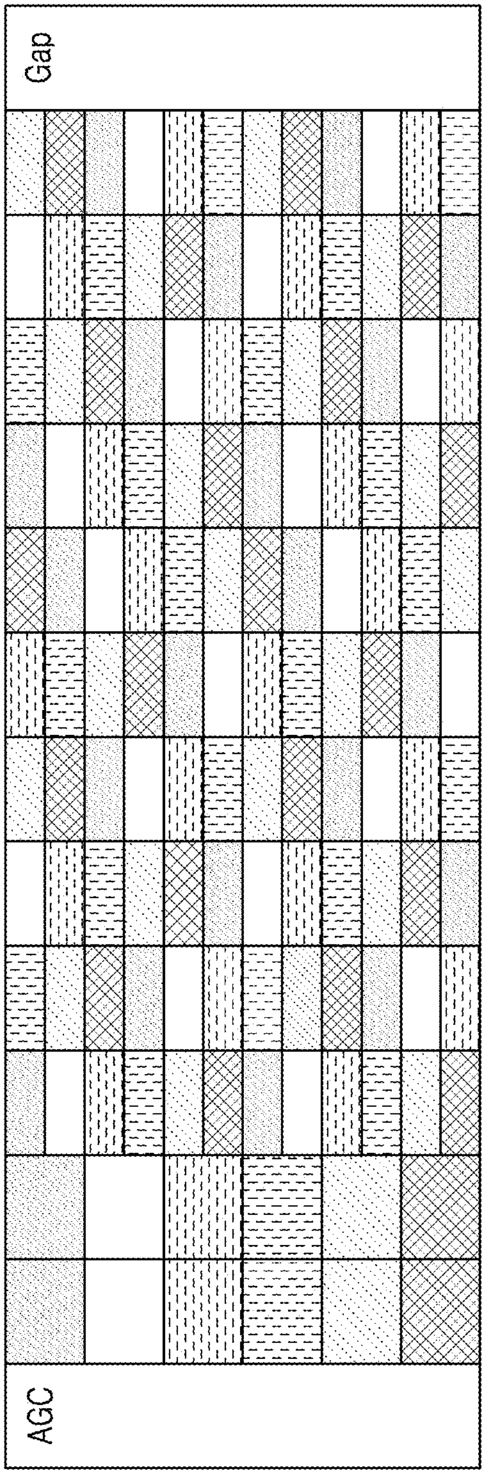
FIG. 5A illustrates an example of a physical layer structure according to an embodiment of the present disclosure.
Figure 5B:
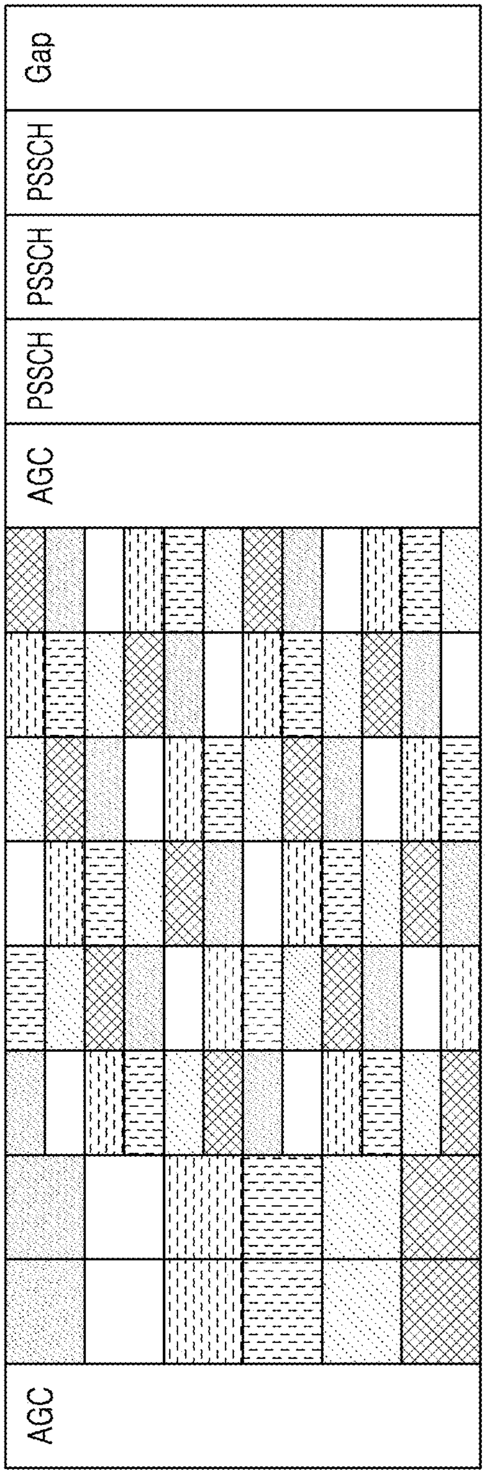
FIG. 5B illustrates an example of a physical layer structure according to an embodiment of the present disclosure.

FIG. 5A shows an embodiment of a first structure, the second and third symbols are used for PSCCH resources, and the remaining symbols except AGC, gap, PSCCH symbols are used for CSI-RS according to an embodiment of the disclosure. FIG. 5B shows an embodiment of another first structure, the difference from FIG. 5A is that there are several symbols for PSSCH according to an embodiment of the disclosure.

Referring to FIGS. 5A and 5B, PSCCH resources are FDM and CSI-RS resources are comb-based multiplexing. The first UE determines that there is no AGC symbol before PSCCH symbols except the first PSCCH symbol and no AGC symbol between PSCCH resources and CSI-RS resources based on the multiplexing type of PSCCH and CSI-RS. In FIG. 5B, it is determined that there is an AGC symbol between PSSCH resources and CSI-RS resources according to the fact that CSI-RS resources and PSSCH resources are FDM and not all CSI-RS resources correspond to PSSCH resources. According to the fact that PSCCHs are FDM, CSI-RS resources are not TDM, it is determined that there is no gap symbol between resources except the last gap.

Figure 6A:
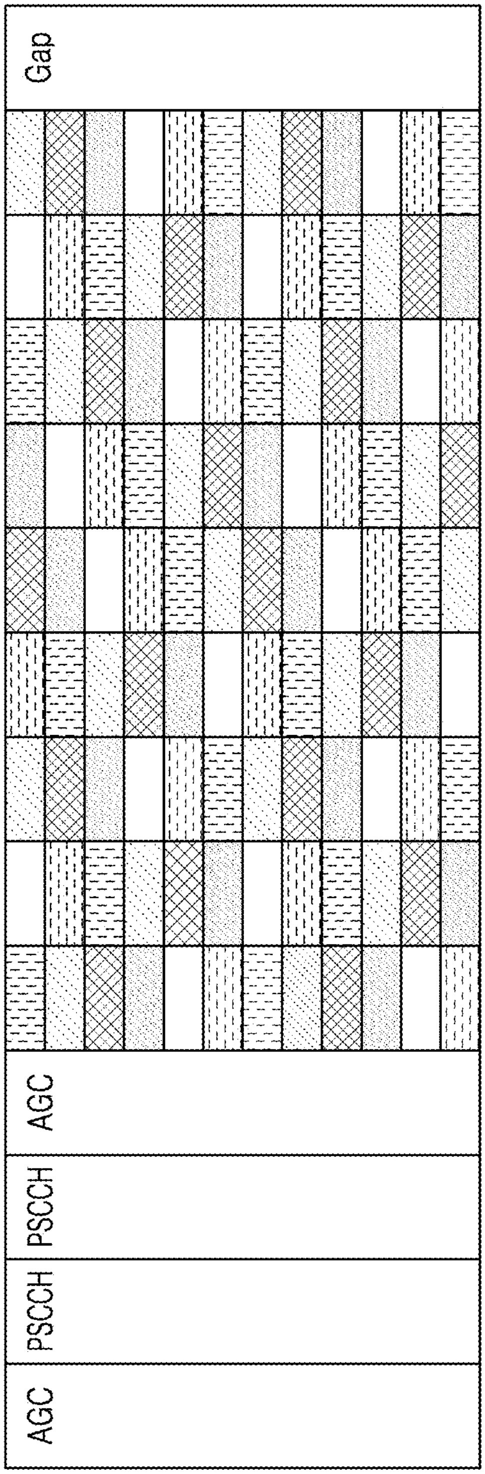
FIG. 6A illustrates an example of a physical layer structure according to an embodiment of the present disclosure.
Figure 6B:
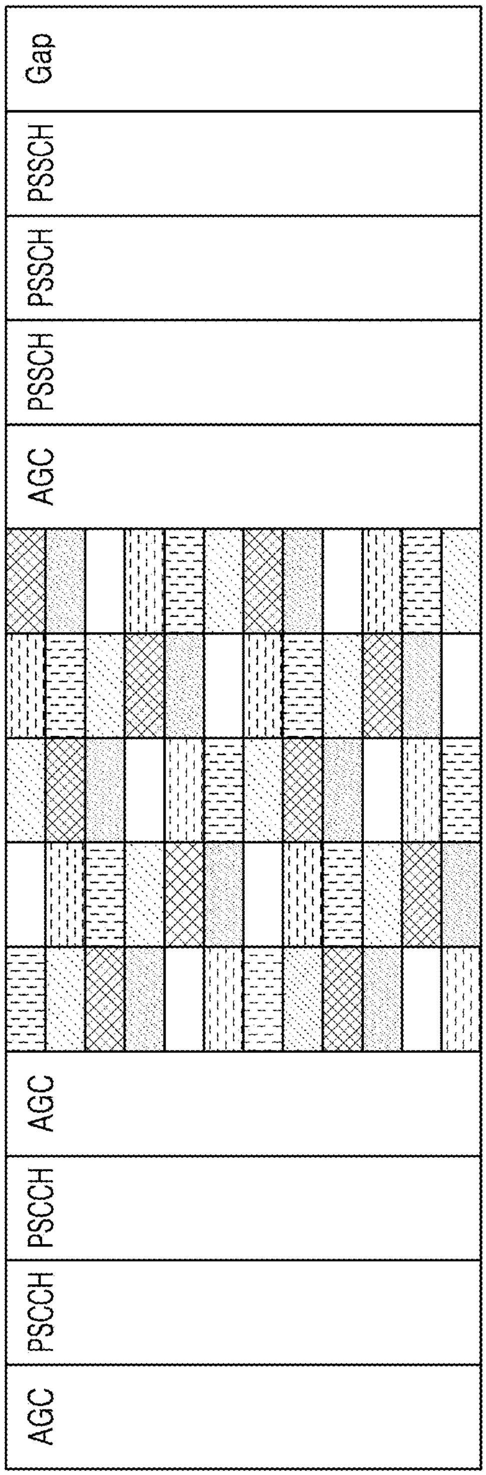
FIG. 6B illustrates an example of a physical layer structure according to an embodiment of the present disclosure.

FIG. 6A shows an embodiment of another first structure, the second and third symbols are used for PSCCH resources, and the remaining symbols except AGC, gap, PSCCH symbols are used for CSI-RS according to an embodiment of the disclosure. FIG. 6B shows an embodiment of another first structure, the difference from FIG. 6A is that there are several symbols for PSSCH according to an embodiment of the disclosure.

Referring to FIGS. 6A and 6B, only one PSCCH resource is included in a subchannel, the PSCCH resource corresponds to multiple CSI-RS resources, the multiple CSI-RS resources are comb-based multiplexing; in addition, if the bandwidth of PSCCH resource is smaller than the bandwidth of the subchannel, PSCCH may also be FDM with PSSCH on the second and third symbols (not shown in the figure). The first UE determines that there is an AGC symbol between PSCCH and CSI-RS resources, and similarly determines that there is an AGC symbol between PSSCH resources and CSI-RS resources, based on the fact that PSCCH resources are TDM with CSI-RS resources, and multiple CSI-RS resources are selectable by different UEs for transmission of different beams.

Figure 7A:
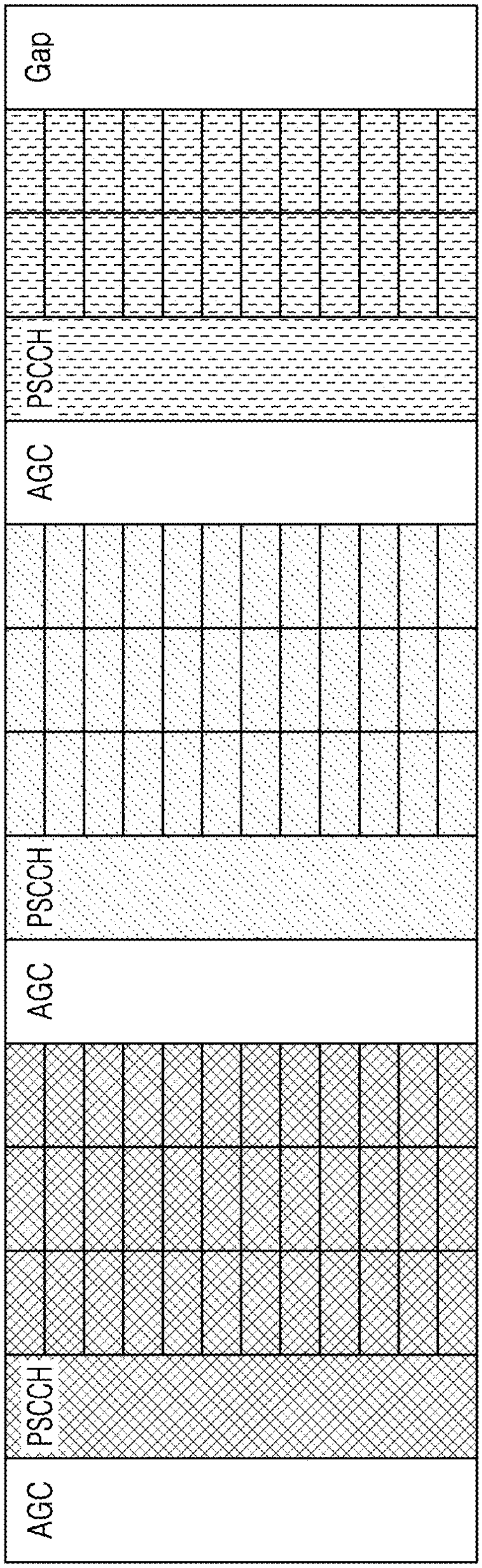
FIG. 7A illustrates an example of a physical layer structure according to an embodiment of the present disclosure.

FIG. 7A shows an embodiment of another first structure, remaining symbols except AGC, gap, PSCCH symbols are used for CSI-RS according to an embodiment of the disclosure.

Wherein PSCCH resources and CSI-RS resources are transmitted consecutively, combinations between different PSCCH and CSI-RS resource are TDM. The first UE determines that there is an AGC symbol between TDM combination of a CSI-RS resource and a PSCCH resource and another combination; determines that there is no gap symbol between the TDM combination of a CSI-RS resource and a PSCCH resource and another combination according to that the UE is configured/preset not to switch between transmitting and receiving within a slot.

Figure 7B:
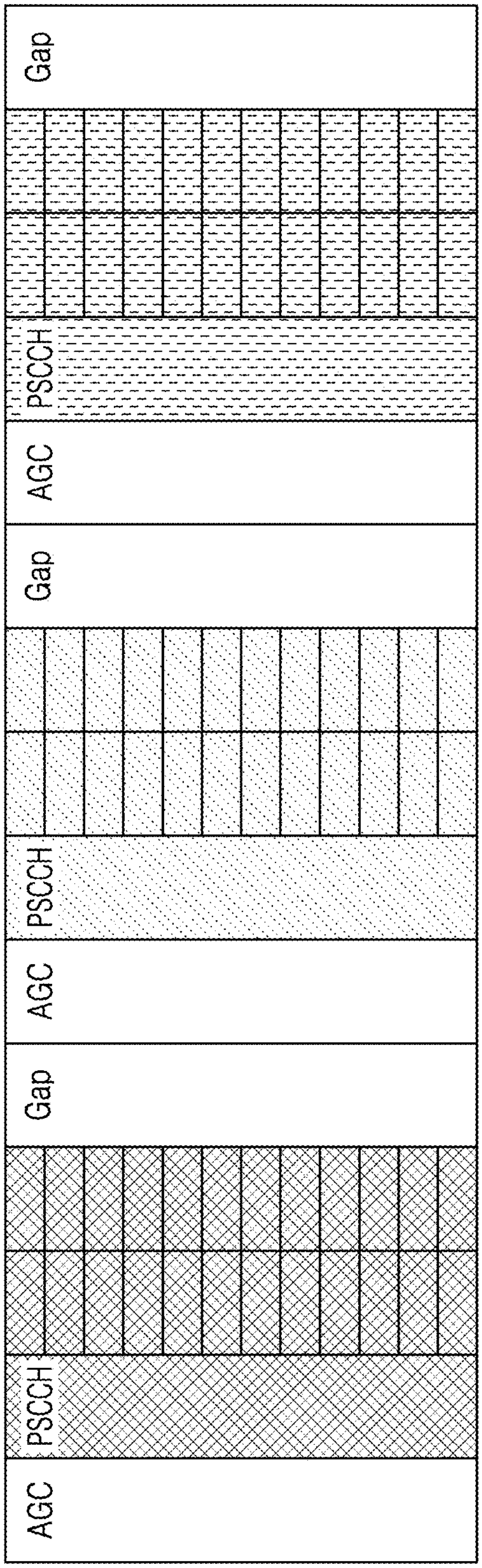
FIG. 7B illustrates an example of a physical layer structure according to an embodiment of the present disclosure.

FIG. 7B illustrates another embodiment of the first structure, and the difference from FIG. 7A is that the first UE determines that there is a gap symbol between the combination of a CSI-RS resource and a PSCCH resource and another combination according to that the first UE is configured/preset to switch between transmitting and receiving within one slot, according to an embodiment of the disclosure.

Figure 8:
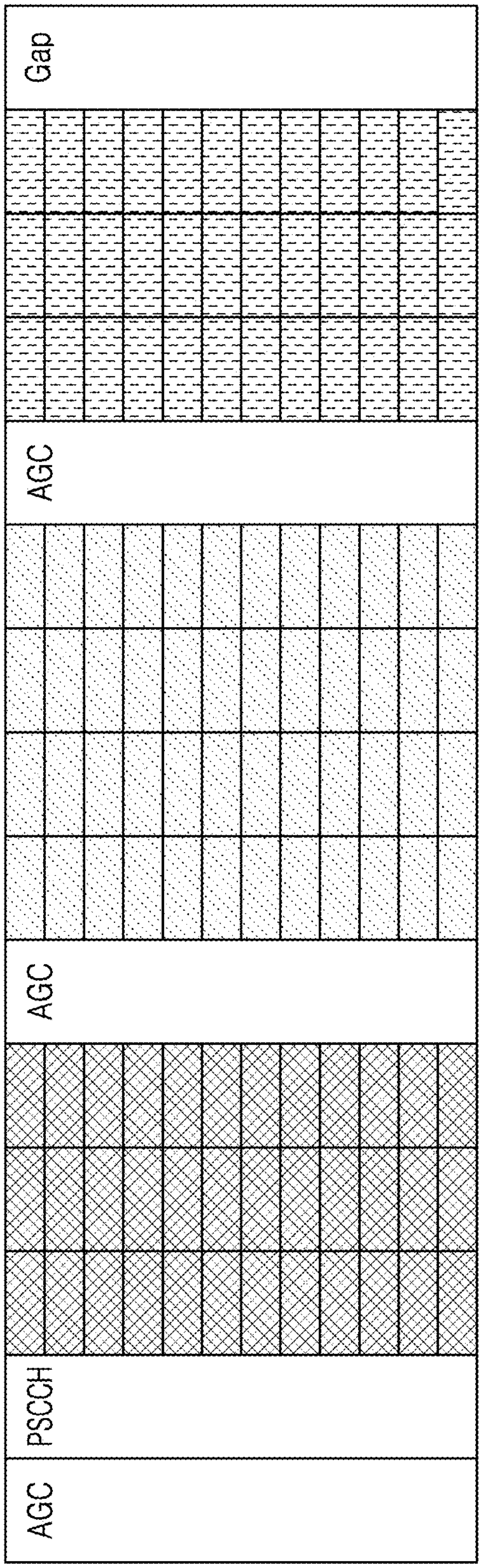
FIG. 8 illustrates an example of a physical layer structure according to an embodiment of the present disclosure.

FIG. 8 shows an embodiment of another first structure, remaining symbols except AGC, gap, PSCCH symbols are used for CSI-RS according to an embodiment of the disclosure.

Referring to FIG. 8, only one PSCCH resource is included within a subchannel, the PSCCH resource corresponds to multiple CSI-RS resources, the multiple CSI-RS resources are TDM. Furthermore, if the bandwidth of PSCCH resource is smaller than the bandwidth of the subchannel, PSCCH may also be FDM with PSSCH on the second and third symbols (not shown in the figure); and/or, there may be several symbols used for PSSCH, which may be TDM on different symbols with other CSI-RS (not shown in the figure). The first UE determines that there is an AGC symbol between the multiple CSI-RS resources based on the fact that multiplexing type of CSI-RS is TDM; determines that there is no gap symbol between the multiple CSI-RS resources based on that the multiple CSI-RS resources correspond to the same PSCCH. There may be no AGC symbol between PSCCH resource and the first adjacent CSI-RS resource, the case where PSCCH and the first CSI-RS are transmitted using the same transmission beam and/or whether same transmission beam is selected by the first UE is indicated in the first information; there may also be an AGC symbol, the case where whether PSCCH and the first CSI-RS should be transmitted using the same transmission beam and/or whether different transmission beams are selected by the first UE is not limited in the first information. If PSSCH resource is further included in the corresponding first structure of FIG. 8, whether there is an AGC symbol between PSSCH resource and adjacent other resource is similarly determined according to whether the transmission beam of PSSCH resource and its TDM adjacent CSI-RS resource and/or PSCCH resource is defined to be the same in the first information, and/or whether the first UE selects the same transmission beam.

Optionally, the first UE transmits at least one of PSCCH, CSI-RS, signals/channels of corresponding AGC using a first structure, and indicates at least one of the following information on the first structure in the SCI:

- Resources of the corresponding AGC, further indicating whether at least one symbol is used for AGC, and/or indicating the position of at least one AGC symbol;
- Resource of the corresponding gap, further indicating whether at least one symbol is used for the gap, and/or indicating position of at least one gap symbol;
- Information of at least one PSCCH resource, the information may correspond to at least one of the information on PSCCH resources in the first information;
- Information of at least one CSI-RS resource, the information may correspond to at least one item of information on CSI-RS resources in the first information.

Wherein the SCI comprises a first stage SCI and/or a second stage SCI, the first stage SCI being transmitted in the PSCCH and the second stage SCI being transmitted in the PSSCH. Or the SCI comprises a SCI (i.e. not divided into first stage and second stage), which is transmitted in the PSCCH.

Since there may be a multiple PSCCH resources in a slot in the first structure, if the UE performs blind detection on the multiple PSCCH resources, the overhead will be increase significantly. Some methods of reducing the increase in blind detection overhead are provided below.

Optionally, the first UE indicates the information of at least one PSCCH resource, including indicates that whether other PSCCH resources in the slot are used for transmission by the first UE and/or indicates the positions of other PSCCH resources in a slot in PSCCH with the earliest time-domain position in the slot.

Optionally, the first UE selects multiple PSCCH resources in the first structure for transmitting PSCCH, including selecting a PSCCH resource with earliest time-domain position or a preset one of the multiple PSCCH resources, and selecting other at least one PSCCH resource for transmitting PSCCH. The first UE may indicate the positions of other PSCCH resources used for transmission in PSCCH on the one PSCCH resource with earliest time-domain position or the preset one of the multiple PSCCH resources, for detection by the second UE; or may not indicate the positions of PSCCH resources used for transmission and accordingly, the second UE may blindly detect whether or not PSCCH is transmitted on all PSCCH resources in the slot when PSCCH on the one PSCCH resource with earliest time-domain position or the preset one of PSCCH resources is detected, otherwise may not blindly detect the remaining PSCCH resources in the slot PSCCH on the one PSCCH resource with earliest time-domain position or the preset one of PSCCH resources is not detected.

Optionally, the first UE obtains a set of resources in the resource pool based on the first information; if multiple PSCCH needs to be transmitted in a slot, the transmission resources are selected in the set, otherwise if one PSCCH needs to be transmitted in a slot, the resource is selected in other resources in the resource pool out of the set or on all resources in the resource pool. Accordingly, the second UE obtains the set of resources in the resource pool based on the first information, performs blind detection on all corresponding PSCCH resources in the set to determine whether there is PSCCH transmitted thereon in the first structure, performs blind detection on other resources out of the set in the resource pool to determine whether there is PSCCH transmitted on one PSCCH resource with the earliest time-domain position in each resource or a preset one of the multiple PSCCH resources. Optionally, this method is used when PSCCH corresponds to beam initial obtaining and/or transmission during beam failure.

A technical effect of the above-described methods is that the UE may not have to blindly detect whether each PSCCH resource in a slot is actually used for transmission of PSCCH, but may detect only on PSCCH resources indicated as being used for actual transmission according to the indication of first UE.

The first UE transmits signals/channels using the first structure based on the first information, further including the first UE selects transmission beam for transmitting at least one of the signals/channels based on the first information and/or the first structure. In some embodiments, when a symbol is a duplication of another symbol, the symbol uses the same transmission beam as the other symbol. For example, the AGC symbol before PSCCH, which is a duplication of the first symbol of PSCCH, uses the same transmission beam as PSCCH; the same is applied to AGC symbols before CSI-RS, PSFCH, PSSCH.

Optionally, based on the first structure, a slot and subchannel include multiple CSI-RS resources, at least one PSSCH resource, and at least one PSCCH resource. The first UE selects at least one CSI-RS resource for transmitting CSI-RS and/or one PSSCH resource for transmitting PSSCH, and selects at least one PSCCH resource for transmitting SCI carrying control information of CSI-RS and/or PSSCH. Optionally, the UE selects the transmission beam of PSCCH, including at least one of the following methods:

Use a preset/configured beam, the preset/configured beam may correspond to the second UE and/or be provided by the second UE;

If the first UE transmits multiple CSI-RSs on multiple CSI-RS resources with the same beam, and/or transmits at least one CSI-RS and PSSCH on at least one CSI-RS resource and on a PSSCH resource with the same beam, transmit PSCCH using the same beam on at least one PSCCH resource;

If the first UE transmits multiple CSI-RSs on multiple CSI-RS resources with different beams, and/or transmits at least one CSI-RS and PSSCH on at least one CSI-RS resource and on PSSCH resource with different beams, use at least one of the following methods to select the transmission beam for the PSCCH, the PSCCH may be the PSCCH associated with the multiple CSI-RSs and/or the at least one CSI-RS and the PSSCH: use a preset/configured beam, the preset/configured beam may be provided in a preset/configuration scheduling multiple CSI-RSs and/or scheduling CSI-RS and PSSCH corresponding to one PSCCH, and/or may be a preset/configured corresponding broadcast/groupcast beam; if both the first UE and the second UE have selected a beam for sidelink communication (e.g., a beam for transmitting PSSCH), using the selected beam; if the first UE is configured with or determines, according to a preset criterion, a correspondence between resource position and transmission beam, wherein the resource position includes a slot index, an index of a CSI-RS resource in a slot, a time-domain and/or frequency-domain position of a CSI-RS resource and/or a slot and/or a subchannel in which CSI-RS resource is located, select the beam for transmitting the PSCCH based on the selected transmission resource and the correspondence. Optionally, this method is used when one PSCCH resource is included in the first structure, and/or when the first UE transmits PSCCH corresponding to the above CSI-RS and/or PSCCH using a PSCCH resource;

If the first UE transmits multiple CSI-RSs on multiple CSI-RS resources with different beams and/or transmits at least one CSI-RS and PSSCH on at least one CSI-RS resource and on a PSSCH resource with different beams, the first UE transmits multiple PSCCHs indicating control information of multiple CSI-RSs and/or PSSCHs, respectively, and transmits each PSCCH using the same transmission beam as its associated CSI-RS and/or PSSCH on multiple PSCCH resources; Optionally, this method is used when multiple PSCCH resources are included in the first structure, and/or when the first UE transmits PSCCH corresponding to CSI-RS and/or PSCCH using multiple PSCCH resources in the same slot and/or subchannel, and/or in different slots and/or subchannels.

Optionally, a slot and subchannel includes at least one CSI-RS resource, at least one PSSCH resource, and at least one PSCCH resource based on the first structure, wherein CSI-RS resource is TDM and/or FDM with PSSCH resource and/or PSCCH resource.

Optionally, if the first UE transmits CSI-RS and PSSCH with different beams and there is overlap between the used time-domain CSI-RS resource and the time-domain PSSCH resource, the first UE transmits CSI-RS and PSSCH using at least one of the following methods:

Dropping transmission of CSI-RS on the overlapped time-domain resources; for example, not mapping CSI-RS to Res on overlapping time-domain resources; Further, for the case where CSI-RS and PSSCH are multiplexed in the same slot, different CSI-RS resources, and/or different CSI-RS mapping manners are selected based on whether the two transmission beams are the same or not;

Dropping transmission of PSSCH on the overlapped time-domain resources; for example, not rate matching PSSCH to overlapping time domain resources, or puncturing part of PSSCH that mapped on the overlapping time domain resources; further, for the case where CSI-RS and PSSCH are multiplexed in the same slot, different transmission parameters for PSSCH including at least one of TBS, MCS are selected based on whether the two transmission beams are the same or not; accordingly, when the second UE receives CSI-RS and PSSCH multiplexed in the same slot, PSSCH is decoded using different transmission parameters of the corresponding PSSCH based on whether the two transmission beams are the same or not;

Transmitting CSI-RS with the transmission beam of PSSCH or PSSCH on the overlapped time-domain resources.

Optionally, the use of at least one of the above methods is based on priority. For example, when the physical layer priority of CSI-RS is lower than the physical layer priority of PSSCH, and/or when the physical layer priority of PSSCH exceeds a threshold (the method may be understood as the priority of CSI-RS is preset to the threshold), the transmission of CSI-RS on the overlapped time-domain resources or the transmission of CSI-RS with the transmission beam of PSSCH is dropped, otherwise the transmission of PSSCH on the overlapped time-domain resources or the transmission of PSSCH with the transmission beam of CSI-RS is dropped.

The first UE transmits signals/channels using the first structure based on the first information, further including: indicates the selected at least one transmission beam in physical layer signaling and/or higher layer signaling. Further including at least one of:

Indicating the selected at least one PSCCH transmission beam in higher layer signaling, the beam may be PSCCH transmission beam used after a given time point, the given time point may be explicitly indicated in the higher layer signaling, and/or calculated by a reference time point, the reference time point may be a time point explicitly indicated in the higher layer signaling or provided in the first information or the time point when the higher layer signaling was received, and an offset may be explicitly indicated in the higher layer signaling or provided in the first information;

Indicating the selected at least one PSSCH transmission beam indicated in the SCI, the beam may be the transmission beam of PSSCH associated with the SCI and/or the transmission beam of PSSCH on resources reserved in the SCI and/or the transmission beam used by PSSCH after a given time point. Wherein the transmission beam used by PSSCH after a given time point is similar to the method in which the higher layer indicates the transmission beam of PSCCH after the given time point, but the method in which the information of the time point, the offset, etc. provided by the higher layer signaling may be provided by the physical layer signaling in this method;

Indicating the selected at least one PSFCH in the SCI, the beam may be the beam that should be used for the corresponding PSFCH of PSSCH associated with the SCI, and/or the beam that should be used for the corresponding PSFCH of PSSCH on the reserved resources in the SCI, and/or the beam that should be used for the corresponding PSFCH of PSSCH after a given time point. Wherein indicating the beam used by PSFCH includes indicating a beam used by the first UE to receive PSFCH and/or a beam used by the second UE to transmit PSFCH since the first UE is a transmitting UE of PSSCH and PSFCH is received by the first UE. Further, since the UE may not directly indicate its reception beam, the first UE may indicate a transmission beam to which at least one reception beam corresponds through correspondence of the transmission beam and the reception beam instead of indicating the reception beam itself. Accordingly, the second UE may select the transmission beam to which the reception beam corresponds, to transmit PSFCH based on the reception beam of the second UE to which the transmission beam indicated by the first UE corresponds through the correspondence of the transmission beam and the reception beam. The indication by the first UE of the beam of PSFCH includes an explicit indication and an implicit indication, the implicit indication includes determining that the beam of PSFCH is determined based on the beams of other signals/channels according to a predetermined criterion, e.g., the reception beam used by the first UE to receive PSFCH is the corresponding reception beam of the transmission beam in which the first UE transmits PSSCH and/or CSI-RS; the correspondence may be preset/configured or indicated to the other by the first UE and/or the second UE in a QCL manner;

Indicating the selected at least one CSI-RS transmission beam in the SCI, the beam may be the transmission beam of CSI-RS associated with the SCI, and/or the transmission beam of CSI-RS on the reserved resources in the SCI, and/or the transmission beam used by CSI-RS after a given time point. Wherein the transmission beam used by CSI-RS after a given time point is similar to the method in which the higher layer indicates the transmission beam of CSI-RS after a given time point, but the method in which the information of the time point, the offset, etc., provided by the higher layer signaling may be provided by the physical layer signaling in this method.

In the above embodiment, the first UE, as a transmitting UE of CSI-RS, obtains the first information and determines a physical layer structure (referred to as the first structure) according to the first information, transmits CSI-RS based on the first structure, and possibly other signals/channels such as PSCCH, PSSCH, DMRS, etc. Accordingly, the second UE, as the receiving UE of CSI-RS, also needs to determine the first structure used by the first UE, receive CSI-RS based on the first structure, and may also receive other signals/channels such as PSCCH, PSSCH, DMRS, etc.

In an embodiment, the second UE obtains the first information, and/or obtains the first information indicated by the first UE in SCI and/or higher layer signaling, determines the first structure based on the first information. Wherein the method for the second UE to obtain the first information and the method for the second UE to determine the first structure based on the first information are similar to the method performed by the first UE, for example, the second UE obtains the first information through UE-specific RRC signaling, resource pool configuration information, preset criteria, or the like; for another example, the second UE determines the physical layer structure of AGC symbols, resources for gap, CSI-RS resources, PSCCH resources, and/or the like in the first structure based on the multiplexing type between different signals/channels indicated in the first information, the positions and/or size of resources of PSCCH and/or CSI-RS (or other sidelink signals/channels), and/or the like. The methods of determining and using the first structure performed by the first UE in the above-described embodiments may each be similarly used for the second UE; but wherein the information related to the transmission power of the first UE, if not indicated to the second UE, may not be used by the second UE as the first information and/or for determining the first structure.

Further, the second UE may also obtain the second information based on information indicated by the first UE in its higher layer signaling (e.g., inter-UE PC5 RRC configuration information) and/or information indicated in the SCI (e.g., information on the first structure indicated by the first UE in the SCI in the method performed by the first UE), and determine the first structure based on the second information. Further, the second UE obtains the information indicated by the first UE in its higher layer signaling, and/or receives the SCI transmitted by the first UE and obtains the information indicated in the SCI, and determines the first structure according to the second information, including determines the structure of the resources of the corresponding AGC, the resources of the corresponding gap, PSCCH and/or CSI-RS resources, and the like.

Furthermore, the second UE may also determine the beam to used when receiving the transmission from the first UE based on the information indicated by the first UE in its higher layer signaling and/or the beam indicated in the SCI (which may be the information that the first UE transmits the beam). Further, when the first UE indicates different transmission beams for the multiple sidelink signals/channels respectively, the second UE accordingly selects different reception beams and receives transmissions from the first UE using the corresponding reception beams on the resources corresponding to the multiple sidelink signals/channels based on the first structure.

Corresponding to the transmitting UE selecting the transmission beam, the receiving UE also needs to select the reception beam and receive the sidelink transmission using the beam. Since the different sidelink communication links usually face different air interface environments and different geographical locations of the transmitting end UE, the reception beams selected by the receiving UE corresponding to the different links are also typically different. Unlike that the receiving UE may simultaneously receive the sidelink transmissions corresponding to different communication links in the low frequency environment, in the high frequency environment, there is also a need for a method for the receiving UE to determine reception beams when it is necessary to simultaneously receive a multiple sidelink transmissions corresponding to different reception beams.

In an embodiment, when the second UE receives the sidelink signals/channels corresponding to different reception beams on the same time-domain resource, the second UE determines the received sidelink signals/channels according to at least one of:

- Priority of the sidelink signal/channel, and/or priority of the reception beam of the corresponding sidelink signal/channel; further, when a reception beam corresponds to multiple sidelink signals/channels, the priority of the reception beam is the highest among the priorities corresponding to the multiple sidelink signals/channels; for example, the second UE receives the sidelink signal/channel using the reception beam corresponding to the sidelink signal/channel with the highest priority or using the reception beam with the highest priority, and/or the sidelink signal/channel received by the second UE includes the sidelink signal/channel with the highest priority corresponding to the multiple sidelink signals/channels and may further include other sidelink signals/channels having the same reception beam as the sidelink channel with the highest priority;
- The number of sidelink signals/channels corresponding to a reception beam; for example, the second UE receives the sidelink signals/channels using the reception beam with the largest number of corresponding sidelink signals/channels, and/or the sidelink signals/channels received by the second UE include the sidelink signals/channels corresponding to the reception beams with the largest number of corresponding sidelink signals/channels.

When the above methods are used in combination, an specific example is that the UE selects a reception beam corresponding to the sidelink signal/channel with the highest priority to receive sidelink signal/channel with the highest priority, and when there are multiple the sidelink signals/channels with the highest priority, the UE selects a reception beam with the largest number corresponding to the sidelink signal/channel with the highest priority to receive the sidelink signal/channel with the highest priority; and the UE may also receive other sidelink signals/channels corresponding to the reception beam.

In another embodiment, when the sidelink signal/channel is PSFCH, the content of the information indicated in PSFCH by the second UE is hybrid automatic repeat request acknowledgment (HARQ-ACK) feedback information or inter-UE coordination (IUC) information. Further, the HARQ-ACK feedback information is prioritized to be received, and the IUC information is received if there is no HARQ-ACK feedback information. This method may be combined with other methods described above, for example, prioritizing receiving HARQ-ACK feedback information and IUC information corresponding to the sidelink signal/channel with the highest priority and/or the PSFCH with the highest priority, when the HARQ-ACK feedback information corresponding to the signal/channel and/or PSFCH and the receiving beam corresponding to the IUC information are different, prioritizing receiving HARQ-ACK feedback information corresponding to the signal/channel and/or PSFCH, and receiving IUC information corresponding to the signal/channel and/or PSFCH if there is no HARQ-ACK feedback information. After determining the received at least one PSFCH, other PSFCHs corresponding to the same beam as PSFCH may also be received.

In an embodiment, the second UE needs to receive multiple PSFCHs simultaneously on PSFCH resources, and the multiple PSFCHs correspond to different transmission beams and/or PSSCHs to which the multiple PSFCHs correspond used different transmission beams. The second UE determines which PSFCHs to receive according to the priorities of PSFCHs that needed to be received and/or according to the priorities of PSSCHs corresponding to the multiple PSFCHs, and/or determines used PSFCH reception beams and receives PSFCHs using the beams. In this embodiment, the UE determines the positions of PSFCH resources required to be received and whether simultaneous reception is required through the transmitted PSSCHs.

In another embodiment, the second UE expects to receive multiple PSCCHs and/or multiple PSSCHs simultaneously on PSCCH and/or PSSCH resources, and the multiple PSCCHs and/or multiple PSSCHs correspond to different reception beams. The second UE determines which PSCCH and/or PSSCH to receive according to the priorities of PSCCHs and/or PSSCHs, and/or determines PSCCH and/or PSSCH reception beams to use and receives PSCCH and/or PSSCH using the beams. In this embodiment, the UE determines the positions of PSCCH and/or PSSCH resources needed to be received and whether simultaneous reception is needed by indications of other UEs in higher layer signaling (e.g., information of a configured grant transmitted by a sidelink UE to the second UE, similar to information of a configured grant used in downlink signaling to indicate a sidelink transmission) and/or in SCI (e.g., information of future resources that may be reserved in SCI); further, the priorities of PSCCHs and/or PSSCHs may also be indicated in the above-mentioned higher layer signaling/SCI.

In another embodiment, the second UE expects to receive at least one PSSCH and at least one CSI-RS on PSSCH resources, and the at least one PSSCH and the at least one CSI-RS correspond to different reception beams. The second UE determines which PSSCH and/or CSI-RS to receive according to the priorities of PSSCH and/or CSI-RS and/or determines PSSCH and/or CSI-RS reception beams to use and receives PSSCH and/or CSI-Rs using the beams. In this embodiment, the UE determines the positions of PSSCH and/or CSI-RS resources needed to be received and whether simultaneous reception is needed according to indications of other UEs in higher layer signaling/SCI (similar to the previous method); the SCI may be a previously received SCI indicating that PSSCH and/or CSI-RS transmission is reserved or may be a SCI associated with PSSCH and/or CSI-RS transmission, e.g., a SCI transmitted in the same slot as PSSCH and/or CSI-RS. Further, when the second UE determines how to receive according to the priorities of PSSCH and/or CSI-RS, the priorities of PSSCH and/or CSI-RS may also be indicated in the above-mentioned higher layer signaling and/or SCI, or may be preset, e.g., the priority of CSI-RS is a preset value; or determining that the priority of PSSCH is higher/lower than CSI-RS according to whether the priority of PSSCH is higher than a sixth threshold and/or lower than a seventh threshold (which may also be described as determining to prioritize the reception of PSSCH or to prioritize the reception of CSI-RS), the sixth threshold and/or the seventh threshold may be understood as corresponding to the priority of CSI-RS.

Figure 9:
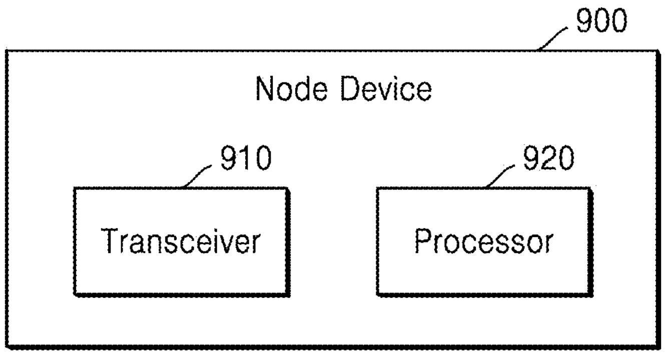
FIG. 9 is a block diagram illustrating a node device according to an example embodiment of the present disclosure.

FIG. 9 is a block diagram illustrating a node device according to an embodiment of the disclosure.

Referring to FIG. 9, the node device 900 includes a transceiver 910 and a processor 920.

The transceiver 910 is configured to transmit and/or receive at least one of CSI-RS, PSCCH, PSSCH, PSFCH.

The processor 920 is coupled to the transceiver 910 and configured to execute the instructions to cause the node device 900 to perform any of the methods described above. The processor may also be replaced with a controller.

Herein, a UE may refer to any terminal having wireless communication capabilities including, but not limited to, a mobile phone, a cellular phone, a smart phone or a Personal Digital Assistant (PDA), a portable computer, an image capture device such as a digital camera, a gaming device, a music storage and playback device, and any portable unit or terminal having wireless communication capabilities, or an Internet facility allowing wireless Internet access and browsing and the like. The transceiver herein may be of any type suitable to the technical environment herein and may be implemented using any suitable data storage technology, including, without limitation, semiconductor-based memory devices, magnetic memory devices and systems, optical memory devices and systems, fixed memory and removable memory. The processor herein may be of any type suitable to the technical environment herein, including, without limitation, one or more of the following: general purpose computers, special purpose computers, microprocessors, digital signal processors (DSPs), and processors based on a multi-core processor architecture.

Those skilled in the art will appreciate that the disclosure includes apparatus for performing one or more of the operations described herein. These devices may be specially designed and manufactured for the desired purpose, or may include known devices in general purpose computers. These devices have a computer program stored therein which is selectively activated or reconfigurable. Such a computer program may be stored in a device (e.g., a computer) readable medium including, but not limited to, any type of disk including floppy disks, hard disks, optical disks, compact disc (CD)-ROMs, and magnetic-optical disks, ROM, RAM, erasable programmable ROM (EPROM), electrically erasable programmable ROM (EEPROM), flash memory, magnetic cards, or optical cards or in any type of media suitable for storing electronic instructions, and respectively coupled to a bus. That is, the readable medium includes any medium that may store or transmit information in a form that may be read by a device (e.g., a computer).

It will be understood by those of skill in the art that each block of the structure diagrams and/or block diagrams and/or flow diagrams, and combinations of blocks in the structure diagrams and/or block diagrams and/or flow diagrams, may be implemented by computer program instructions. Those skilled in the art may understand that these computer program instructions may be provided to a processor of a general-purpose computer, a specialized computer, or other programmable data processing methods to be implemented, so that the schemes specified in the block or blocks of the structure diagrams and/or block diagrams and/or flow diagrams disclosed in the disclosure are executed by the processor of the computer or other programmable data processing methods.

It will be appreciated by those skilled in the art that various operations, methods, steps in processes, measures, schemes that have been discussed in the disclosure may be alternated, altered, combined, or deleted. Further, other steps, measures, schemes of the various operations, methods, processes, processes that have been discussed in the disclosure may also be alternated, altered, rearranged, disassembled, combined, or deleted. Further, steps, measures, schemes of various operations, methods, processes and processes disclosed in the disclosure may also be alternated, modified, rearranged, broken down, combined or deleted.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first node in a communication system, the method comprising:

obtaining first information, wherein the first information includes information on channel state information reference signal (CSI-RS), resources; and transmitting CSI-RS based on the first information, wherein, in case that the information on the CSI-RS resources indicates that multiplexing type between the CSI-RS resources is time division multiplexing, an adjacent symbol before a first symbol of time division multiplexed CSI-RS resources is a duplication of the first symbol of the time division multiplexed CSI-RS resources, and wherein, in case that all CSI-RS resources are used by the first node and the first node uses a same beam for transmission on the CSI-RS resources, the adjacent symbol before the first symbol of the CSI-RS resources is not a duplication of other symbols.

2. The method of claim 1, wherein the first information further includes information on physical sidelink control channel (PSCCH), resources, wherein the method further comprises transmitting PSCCH based on the first information, wherein, in case that the information on the PSCCH resources indicates that multiplexing type between the PSCCH resources is the time division multiplexing, an adjacent symbol before a first symbol of time division multiplexed PSCCH resources is a duplication of the first symbol of the time division multiplexed PSCCH resources, and wherein, in case that the information on the PSCCH resources indicates that the multiplexing type between the PSCCH resources is time division multiplexing, and all the time division multiplexed PSCCH resources are used by the first node, an adjacent symbol before the first symbol of the time division multiplexed PSCCH resources is not a duplication of other symbols.

3. The method of claim 1, wherein the first information further includes information on physical sidelink feedback channel (PSFCH) resources, wherein the method further comprises transmitting PSFCH based on the first information, wherein, in case that the information on the PSFCH resources indicates that multiplexing type between PSFCH resources is the time division multiplexing, an adjacent symbol before a first symbol of time division multiplexed PSFCH resources is a duplication of the first symbol of the time division multiplexed PSFCH resources, and wherein, in case that the physical sidelink shared channel (PSSCH) resources to which the PSFCH resources correspond include different PSSCH resources, an adjacent symbol before the first symbol of PSFCH resources is a duplication of the first symbol of PSFCH resources.

4. The method of claim 1, wherein, in case that the first information indicates that the multiplexing type between the CSI-RS resources and PSCCH resources is time division multiplexing, if any one of the CSI-RS resources corresponds to at least one of the PSCCH resources and any one of the PSCCH resources corresponds to at least one of the CSI-RS resources, the adjacent symbol before the first symbol of the CSI-RS resources is not a duplication of other symbols.

5. The method of claim 1, wherein the first information further includes information on physical sidelink shared channel (PSSCH) resources, wherein the method further comprises transmitting PSSCH based on the first information, and wherein, in case that the CSI-RS resources and the PSSCH resources are both used by the first node and the first node uses a same beam for transmission on the CSI-RS resources and the PSSCH resources, the adjacent symbol before the first symbol of the CSI-RS resources is not a duplication of other symbols.

6. The method of claim 1, further comprising:

in case that a first condition is met, the adjacent symbol before the first symbol of the CSI-RS resources is not a duplication of other symbols, wherein the first condition includes at least one of the following:

CSI-RS transmission power is the same as PSCCH transmission power, the CSI-RS transmission power and the PSCCH transmission power do not reach a maximum value of transmission power, a value of relevant parameter for calculating the CSI-RS transmission power and the PSCCH transmission power do not exceed a first threshold or does not comply with a predetermined threshold range, the CSI-RS transmission power and the PSCCH transmission power are below a second threshold or complies with a predetermined threshold range, a frequency-domain size of the CSI-RS resources is below a third threshold, and a ratio of the frequency-domain size of the CSI-RS resources and a frequency-domain size of PSCCH resources is below a fourth threshold.

7. The method of claim 1, wherein, in case that a time-domain size of the CSI-RS resources exceeds a fifth threshold, the adjacent symbol before the first symbol of the CSI-RS resources is not a duplication of the other symbols.

8. The method of claim 1, wherein, in case that the information on the CSI-RS resources indicates that the multiplexing type between the CSI-RS resources is time division multiplexing, an adjacent symbol after a last symbol of the time division multiplexed CSI-RS resources is used for a gap, and wherein, in case that the information on the CSI-RS resources indicates that the multiplexing type between the CSI-RS resources is the time division multiplexing, and multiplexing type between PSCCH/PSSCH/PSFCH resources corresponding to the time division multiplexed CSI-RS resources is time division multiplexing, the adjacent symbol after the last symbol of the time division multiplexed CSI-RS resources is used for the gap.

9. The method of claim 1, wherein the first information further includes information on physical sidelink control channel (PSCCH) resources, wherein the method further comprises transmitting PSCCH based on the first information, and wherein, in case that the information on the PSCCH resources indicates that multiplexing type between the PSCCH resources is time division multiplexing, an adjacent symbol after a last symbol of time division multiplexed PSCCH resources is used for a gap.

10. The method of claim 1, wherein the first information further includes information on physical sidelink feedback channel (PSFCH) resources, wherein the method further comprises transmitting PSFCH based on the first information, and wherein, in case that the information on the PSFCH resources indicates that multiplexing type between the PSFCH resources is time division multiplexing, an adjacent symbol after a last symbol of time division multiplexed PSFCH resources is used for a gap.

11. The method of claim 1, wherein the first information further includes information on physical sidelink shared channel (PSSCH) resources, wherein the method further comprises transmitting PSSCH based on the first information, and wherein, in case that the information on the PSSCH resources indicates that multiplexing type between the PSSCH resources is time division multiplexing, an adjacent symbol after a last symbol of time division multiplexed PSSCH resources is used for a gap.

12. The method of claim 1, further comprising:

transmitting sidelink control information (SCI), wherein at least one of the following information is indicated in the SCI:

information on resource used as the duplication of the other symbols, information on resources used for gap, information on physical sidelink control channel (PSCCH) resources, and information on the CSI-RS resources.

13. The method of claim 1, further comprising:

determining a transmission beam for transmitting at least one of physical sidelink control channel (PSCCH), physical sidelink shared channel (PSSCH) or the CSI-RS; and transmitting the at least one of the PSCCH, the PSSCH or the CSI-RS using the determined transmission beam.

14. The method of claim 13, wherein determining the transmission beam comprises at least one of:

determining a preset/configured beam as a transmission beam for transmitting the PSCCH, and in case that the first node transmits multiple CSI-RSs on multiple CSI-RS resources using a same beam, and/or transmits at least one CSI-RS and PSSCH on at least one CSI-RS resource and PSSCH resource using a same beam, determining that the same beam as the transmission beam for transmitting the PSCCH, and wherein the PSCCH is a PSCCH associated with the multiple CSI-RSs and/or the at least one CSI-RS and PSSCH.

15. The method of claim 13,

Wherein, in case that the first node transmits multiple CSI-RSs on multiple CSI-RS resources using different beams, and transmits at least one CSI-RS and PSSCH on at least one CSI-RS resource and PSSCH resource using different beams, and the first node transmits PSCCH using one PSCCH resource, determining a transmission beam for transmitting PSCCH uses at least one of:

determining a preset/configured beam as the transmission beam for transmitting the PSCCH, determining a beam for sidelink communication selected by both the first node and a second node receiving PSCCH as the transmission beam for transmitting the PSCCH, and in case that the first node is configured with or determines, according to a preset criterion, a correspondence between a position of PSCCH resources and the transmission beam, determining the transmission beam for the PSCCH based on PSCCH resources and the correspondence, and wherein the PSCCH is a PSCCH associated with the multiple CSI-RSs or the at least one CSI-RS and PSSCH.

16. The method of claim 13, wherein, in case that the first node transmits multiple CSI-RSs on multiple CSI-RS resources using different beams, and transmits at least one CSI-RS and PSSCH on at least one CSI-RS resource and PSSCH resource using different beams, and the first node transmits PSCCH using multiple PSCCH resources, the method further comprises:

transmitting multiple PSCCHs indicating control information of multiple CSI-RSs and/or PSSCH respectively; and transmitting, on the multiple PSCCH resources, each PSCCH using the same transmission beam as its associated CSI-RS and/or PSSCH.

17. The method of claim 13, wherein, in case that the first node transmits CSI-RS and PSSCH using different beams and there is overlap between time-domain resources of the CSI-RS and time-domain resources of the PSSCH, the first node transmits the CSI-RS and the PSSCH using at least one of:

dropping transmission of CSI-RS on the overlapped time-domain resources;

dropping transmission of PSSCH on the overlapped time-domain resources; and transmitting CSI-RS using transmission beam used for the PSSCH on the overlapped time-domain resources, or transmitting PSSCH using transmission beam used for the CSI-RS on the overlapped time-domain resources.

18. The method of claim 13, further comprising indicating, via sidelink control information (SCI) or higher layer signaling, at least one of:

indicating the determined transmission beam for transmitting PSCCH in the higher layer signaling;

indicating the determined transmission beam for transmitting PSSCH in the SCI;

indicating the determined transmission beam for transmitting PSFCH in the SCI; and indicating the determined transmission beam for transmitting CSI-RS in the SCI.

19. The method of claim 1, wherein when the first information indicates that a time unit includes multiple physical sidelink control channel (PSCCH) resources, the method further comprises determining the PSCCH resources and transmitting a PSCCH using at least one of:

indicating, in a PSCCH with an earliest position in a time-domain in the time unit, whether there are other PSCCH resources used by the first node for transmission in the time unit and indicating position of the other PSCCH resources in the time unit;

selecting one PSCCH resource with the earliest position in the time-domain or a preset one of the multiple PSCCH resources for transmitting PSCCH, and selecting at least one other PSCCH resource for transmitting PSCCH;

obtaining a set of resources in a resource pool based on the first information; and selecting PSCCH resources in the set of resources in case that the multiple PSCCH resources are transmitted in the time unit, selecting PSCCH resources except the set of resources in the resource pool in case that one PSCCH is transmitted in the time unit.

20. A node comprising:

a transceiver; and at least one processor coupled with the transceiver and configured to:

obtain first information, wherein the first information includes information on channel state information reference signal (CSI-RS) resources, and transmit CSI-RS based on the first information, wherein, in case that the information on the CSI-RS resources indicates that multiplexing type between the CSI-RS resources is time division multiplexing, an adjacent symbol before a first symbol of time division multiplexed CSI-RS resources is a duplication of the first symbol of the time division multiplexed CSI-RS resources, and wherein, in case that all CSI-RS resources are used by the node and the node uses a same beam for transmission on the CSI-RS resources, the adjacent symbol before the first symbol of the CSI-RS resources is not a duplication of other symbols.

* * * * *